United States Patent
Kamplain et al.

(10) Patent No.: US 12,173,136 B2
(45) Date of Patent: Dec. 24, 2024

(54) ADDITIVE SYSTEMS CONTAINING AN ANTIOXIDANT AND A GLYCEROL STEARATE FOR IMPROVED COLOR IN POLYETHYLENE RESINS

(71) Applicant: Chevron Phillips Chemical Company LP, The Woodlands, TX (US)

(72) Inventors: Justin W. Kamplain, Bartlesville, OK (US); Elizabeth M. Lanier, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/938,689

(22) Filed: Oct. 7, 2022

(65) Prior Publication Data

US 2023/0052912 A1    Feb. 16, 2023

Related U.S. Application Data

(62) Division of application No. 16/396,866, filed on Apr. 29, 2019, now abandoned.

(51) Int. Cl.
| | |
|---|---|
| C08K 5/103 | (2006.01) |
| C08F 10/02 | (2006.01) |
| C08J 3/22 | (2006.01) |
| C08K 5/13 | (2006.01) |
| C08K 5/38 | (2006.01) |
| C08K 5/524 | (2006.01) |

(52) U.S. Cl.
CPC ............. *C08K 5/103* (2013.01); *C08F 10/02* (2013.01); *C08J 3/226* (2013.01); *C08K 5/13* (2013.01); *C08K 5/38* (2013.01); *C08K 5/524* (2013.01); *C08K 2201/014* (2013.01)

(58) Field of Classification Search
CPC . C08K 5/103; C08K 5/13; C08K 5/38; C08K 5/524; C08F 10/02; C08J 3/226
See application file for complete search history.

(56) References Cited

U.S. PATENT DOCUMENTS

| | | |
|---|---|---|
| 3,248,179 A | 4/1966 | Norwood |
| 4,390,666 A | 6/1983 | Moriguchi |
| 4,451,604 A | 5/1984 | Mills |
| 4,501,885 A | 2/1985 | Sherk |

(Continued)

FOREIGN PATENT DOCUMENTS

| | | |
|---|---|---|
| CN | 101173013 A | 5/2008 |
| CN | 108794898 A | 11/2018 |

(Continued)

OTHER PUBLICATIONS

English translation of JP 50013438A. (Year: 1975).*

(Continued)

*Primary Examiner* — John E Uselding
(74) *Attorney, Agent, or Firm* — Merchant & Gould P.C.

(57) ABSTRACT

Polymer compositions containing an ethylene polymer, 50-1500 ppm by weight of a glycerol stearate, and 250-7500 ppm by weight of an antioxidant selected from a phenolic antioxidant, a phosphite antioxidant, a thioester antioxidant, or any combination thereof, are described. These polymer compositions have improved initial color, improved color after long-term aging, or improved color after multi-pass extrusion processing.

23 Claims, 17 Drawing Sheets

(56) References Cited

U.S. PATENT DOCUMENTS

| | | | |
|---|---|---|---|
| 4,588,790 A | 5/1986 | Jenkins, III | |
| 4,879,359 A * | 11/1989 | Chamla | C08F 10/00 |
| | | | 526/904 |
| 5,073,437 A | 12/1991 | Akao | |
| 5,132,344 A | 7/1992 | Matteodo | |
| 5,352,749 A | 10/1994 | DeChellis | |
| 5,436,304 A | 7/1995 | Griffin | |
| 5,565,175 A | 10/1996 | Hottovy | |
| 5,575,979 A | 11/1996 | Hanson | |
| 5,750,584 A | 5/1998 | Knaus | |
| 6,225,363 B1 | 5/2001 | Wilkes | |
| 6,239,235 B1 | 5/2001 | Hottovy | |
| 6,262,191 B1 | 7/2001 | Hottovy | |
| 6,299,809 B1 | 10/2001 | McIntyre | |
| 6,613,823 B1 | 9/2003 | Battiste | |
| 6,833,415 B2 | 12/2004 | Kendrick | |
| 7,531,606 B2 | 5/2009 | Hendrickson | |
| 7,589,327 B2 | 9/2009 | Kerwin | |
| 8,822,608 B1 | 9/2014 | Bhandarkar | |
| 9,938,359 B2 | 4/2018 | Covezzi | |
| 2008/0076857 A1 | 3/2008 | D'Uva | |
| 2008/0167597 A1 | 7/2008 | Dougherty | |
| 2011/0034635 A1 | 2/2011 | Kapur | |
| 2012/0276357 A1 | 11/2012 | Soto-Valdez | |
| 2013/0190466 A1 | 7/2013 | Baita | |
| 2014/0179873 A1 | 6/2014 | Lam | |
| 2015/0376303 A1 | 12/2015 | Covezzi | |
| 2017/0089503 A1 | 3/2017 | Gauthier | |
| 2018/0340057 A1 | 11/2018 | Kamplain | |
| 2019/0136021 A1 | 5/2019 | Kobayashi | |

FOREIGN PATENT DOCUMENTS

| | | |
|---|---|---|
| CN | 109438603 B | 12/2021 |
| EP | 0 781 803 A1 | 7/1997 |
| EP | 3245864 A1 | 11/2017 |
| JP | 5013438 A | 2/1975 |
| RU | 2584694 C2 | 5/2016 |
| RU | 2619926 C2 | 5/2017 |
| WO | 2012041813 A1 | 4/2012 |
| WO | 2014108283 A1 | 7/2014 |
| WO | 2020223055 A1 | 11/2020 |

OTHER PUBLICATIONS

Xu et al. Highly Active Half-Metallocene Chromium(III) Catalysts for Ethylene Polymerization Activated by Trialkylaluminum. J. Am. Chem. Soc. 2007, 129, 2236-2237. (Year: 2007).*

Search Report issued in corresponding Chinese Application No. 2020800105990 mailed on Jan. 5, 2023, 2 pp.

Search Report issued in related Russian Application No. 2021122440, mailed on Aug. 22, 2022, 2 pp.

Film Extrusion Manual—Process, Materials, Properties, Tappi Press, 1992, 16 pages.

IUPAC Compendium of Chemical Terminology, 2nd Ed. 1997, pp. 1-1670.

Modern Plastics Encyclopedia, Mid-Nov. 1995 Issue, vol. 72, No. 12, 3 pages.

* cited by examiner

ADDITIVE SYSTEMS CONTAINING AN ANTIOXIDANT AND A GLYCEROL STEARATE FOR IMPROVED COLOR IN POLYETHYLENE RESINS

REFERENCE TO RELATED APPLICATION

This application is a divisional application of co-pending U.S. patent application Ser. No. 16/396,866, filed on Apr. 29, 2019, the disclosure of which is incorporated herein by reference in its entirety.

BACKGROUND OF THE INVENTION

Ethylene polymers such as high density polyethylene (HDPE) homopolymer or copolymer and linear low density polyethylene (LLDPE) copolymer can be produced using various combinations of catalyst systems and polymerization processes. Ziegler-Natta, metallocene, and chromium-based catalyst systems are the most common catalyst systems used to produce such ethylene polymers.

However, regardless of the catalyst system, ethylene polymers that contain an antioxidant can exhibit off-color initially, color formation—such as yellowing—after long-term aging, or color formation when subjected to high temperatures—such as in extrusion processing. It would be beneficial to have additive systems that provide ethylene polymers with improvements in one or more of the initial color, aged color, and/or multi-pass extrusion color. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to polymer compositions having improved initial color, improved aged color, improved multi-pass extrusion color, or any combination of these improvements in color. Such polymer compositions can contain an ethylene polymer, from about 50 ppm to about 1500 ppm by weight of a glycerol stearate, and from about 250 ppm to about 7500 ppm by weight of an antioxidant comprising a phenolic antioxidant, a phosphite antioxidant, a thioester antioxidant, or any combination thereof.

Methods for improving the color (e.g., initial color, aged color, or multi-pass extrusion color) of a polymer composition also are provided in the present invention. A representative method can comprise combining an ethylene polymer with an additive system comprising a glycerol stearate and an antioxidant to form the polymer composition. The polymer composition can contain from about 50 ppm to about 1500 ppm by weight of a glycerol stearate, and from about 250 ppm to about 7500 ppm by weight of an antioxidant comprising a phenolic antioxidant, a phosphite antioxidant, a thioester antioxidant, or any combination thereof.

Processes for producing polymer compositions with improved color (e.g., initial color, aged color, or multi-pass extrusion color) are disclosed in other aspects of this invention. For example, the process can comprise (a) contacting a transition metal-based catalyst system with ethylene and an optional olefin comonomer under polymerization conditions in a polymerization reactor system to produce an ethylene polymer, and (b) combining the ethylene polymer with an additive system comprising a glycerol stearate and an antioxidant to form the polymer composition. In this process, the polymer composition can contain from about 50 ppm to about 1500 ppm by weight of a glycerol stearate, and from about 250 ppm to about 7500 ppm by weight of an antioxidant comprising a phenolic antioxidant, a phosphite antioxidant, a thioester antioxidant, or any combination thereof.

Additive systems that can be combined with the ethylene polymer to form the polymer composition also are encompassed herein. In one aspect, a masterbatch composition is described, and in this aspect, the masterbatch composition can contain a carrier resin and an additive mixture comprising a glycerol stearate and an antioxidant comprising a phenolic antioxidant, a phosphite antioxidant, a thioester antioxidant, or any combination thereof, at a weight ratio of glycerol stearate:antioxidant in a range from about 6:1 to about 1:150. The weight ratio of the carrier resin:additive mixture in the masterbatch composition ranges from about 95:5 to about 20:80. In another aspect, an additive blend composition is described, and in this aspect, the additive blend composition can contain at least about 95 wt. % of an additive mixture comprising a glycerol stearate and an antioxidant comprising a phenolic antioxidant, a phosphite antioxidant, a thioester antioxidant, or any combination thereof, at a weight ratio of glycerol stearate:antioxidant in a range from about 6:1 to about 1:150, and less than or equal to about 3 wt. % of an ethylene polymer, a propylene polymer, or any combination thereof. Optionally, a small percentage of a binding agent can be present in the additive blend composition.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
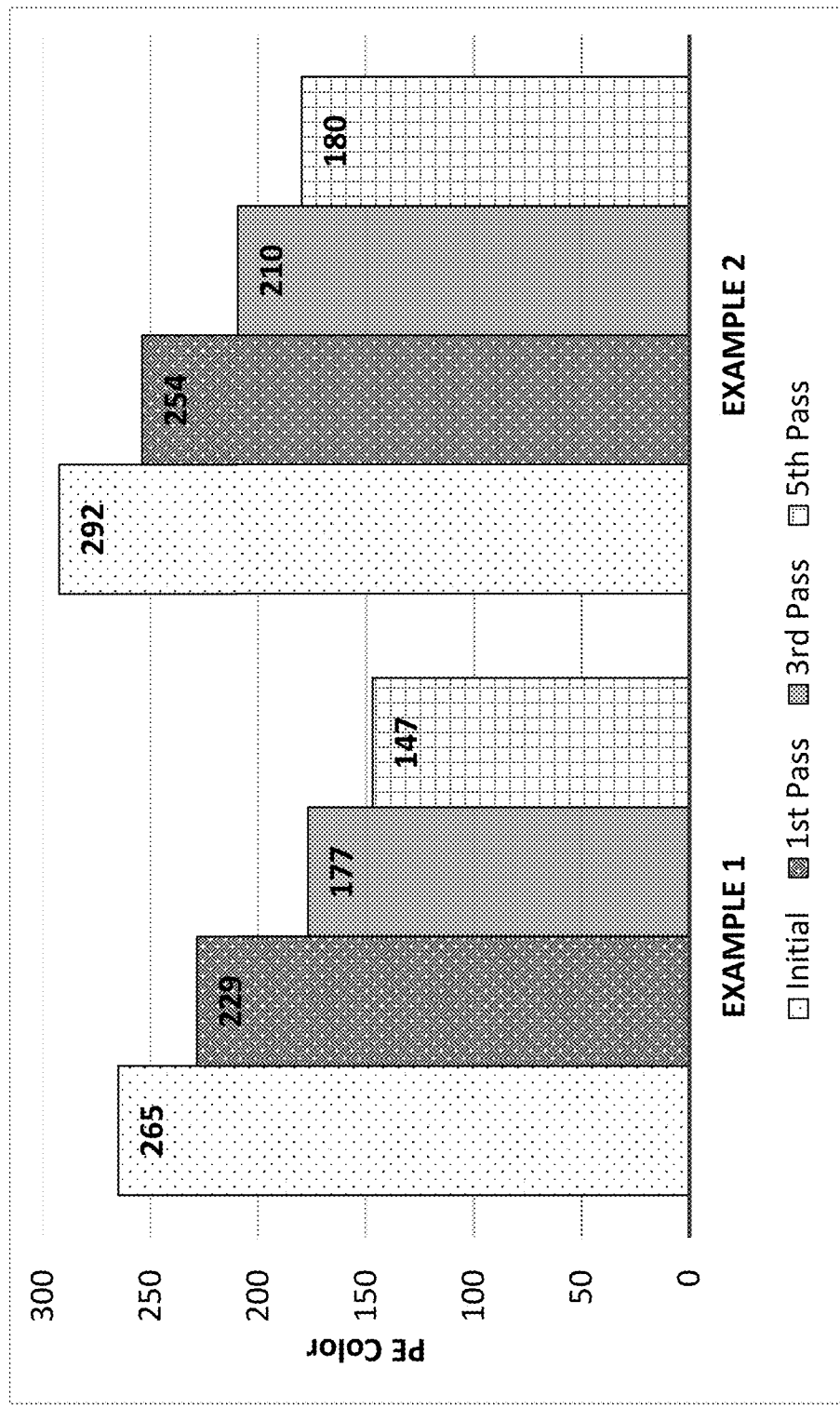
FIG. 1 presents a plot of the initial PE Color Number and multi-pass extrusion color after 1, 3, and 5 extrusion passes at 240° C. for the polymer compositions of Examples 1-2.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and processes/methods are described herein in terms of "comprising" various components or steps, the compositions and processes/methods can also "consist essentially of" or "consist of" the various components or steps, unless stated otherwise. For example, an additive system consistent with aspects of the present invention can comprise; alternatively, can consist essentially of; or alternatively, can consist of; a glycerol stearate, a phenolic antioxidant, and a monophosphite antioxidant.

The terms "a," "an," "the," etc., are intended to include plural alternatives, e.g., at least one, unless otherwise specified. For instance, the disclosure of "a phenolic antioxidant" or "a monophosphite antioxidant" is meant to encompass one, or mixtures or combinations of more than one, phenolic antioxidant or monophosphite antioxidant, respectively, unless otherwise specified.

The "ppm" (ppm by weight) of any additive or antioxidant component is based on the total weight of the polymer composition, unless specifically stated otherwise.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include ethylene homopolymers, copolymers, terpolymers, and so forth, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers, terpolymers, and so forth. Similarly, the scope of the term "polymerization" includes homopolymerization, copolymerization, terpolymerization, and so forth. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or transition metal component after combining these materials. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that the weight ratio of the diphosphite antioxidant to the monophosphite antioxidant (diphosphite: monophosphite) can be in a range from about 5:1 to about 1:5 in certain aspects. By a disclosure that the weight ratio of diphosphite:monophosphite can be in a range from about 5:1 to about 1:5, the intent is to recite that the weight ratio can be any weight ratio within the range and, for example, can be equal to about 5:1, about 4:1, about 3:1, about 2:1, about 1.5:1, about 1:1, about 1:1.5, about 1:2, about 1:3, about 1:4, or about 1:5. Additionally, the ratio of diphosphite:monophosphite can be within any range from about 5:1 to about 1:5 (for example, the weight ratio can be in a range from about 1.2:1 to about 1:1.2), and this also includes any combination of ranges between about 5:1 and about 1:5. Further, in all instances, where "about" a particular value is disclosed, then that value itself is disclosed. Thus, the disclosure that the weight ratio of diphosphite:monophosphite can be from about 5:1 to about 1:5 also discloses a weight ratio in a range from 5:1 to 1:5 (e.g., from 1.2:1 to 1:1.2), and this also includes any combination of ranges between 5:1 and 1:5. Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to polymer compositions, methods for preparing the polymer compositions, and methods for using the polymer compositions to produce articles of manufacture. In particular, the present invention relates to polymer compositions with improved initial color, improved aged color, and improved multi-pass extrusion color.

There are various techniques that can be used to improve the color of polymer compositions, such as the incorporation of various antioxidants that are known to result in good initial color, aged color, or multi-pass extrusion color. It was unexpectedly found that a glycerol stearate can improve the initial color, aged color, and/or multi-pass extrusion color of polyethylene-based compositions. This is particularly surprising, given that glycerol stearates are not antioxidants, and there is no recognized mechanism for protecting phenolic antioxidants during high temperature processing, such as in multi-pass extrusion experiments.

Ethylene Polymers

The ethylene polymer employed in the polymer composition encompasses homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof, or alternatively, the comonomer can comprise 1-hexene. Typically, the amount of the comonomer, based on the total weight of monomer (ethylene) and comonomer, can be in a range from about 0.01 to about 20 wt. %, from about 0.05 to about 10 wt. %, from about 0.1 to about 5 wt. %, or from about 0.5 to about 8 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof, or alternatively, an ethylene/1-hexene copolymer. Thus, in aspects of this invention, the ethylene polymer can comprise a polymer referred to in the art as a linear low density polyethylene (LLDPE); alternatively, a polymer referred to in the art as a high density polyethylene (HDPE); or alternatively, a combination of a LLDPE and a HDPE.

The densities of ethylene-based polymers disclosed herein often are greater than or equal to about 0.88 g/cm$^3$, for example, greater than or equal to about 0.90 g/cm$^3$, or greater than or equal to about 0.91 g/cm$^3$. Yet, in particular aspects, the density can be in a range from about 0.88 to about 0.97 g/cm$^3$, from about 0.91 to about 0.93 g/cm$^3$, from about 0.92 to about 0.96 g/cm$^3$, from about 0.93 to about 0.96 g/cm$^3$, from about 0.935 to about 0.955 g/cm$^3$, or from about 0.937 to about 0.954 g/cm$^3$.

While not being limited thereto, ethylene polymers described herein often can have a melt index (MI) in a range from 0 to about 10 g/10 min, from 0 to about 5 g/10 min, or from 0 to about 1 g/10 min, in some aspects, and from 0 to about 0.5 g/10 min, from 0 to about 0.3 g/10 min, from about 0.3 to about 10 g/10 min, or from about 0.5 to about 2.5 g/10 min, in other aspects. Additionally or alternatively, the ethylene polymer can have a high load melt index (HLMI) in a range from about 0.5 to about 100 g/10 min, from about 0.5 to about 25 g/10 min, from about 0.5 to about 10 g/10 min, from about 1 to about 50 g/10 min, or from about 1 to about 15 g/10 min.

The ethylene polymers described herein can have any suitable molecular weight distribution, generally encompassing ratios of Mw/Mn ranging from about 1.5-2.5 up to about 40-50, such as from about 2 to about 40, or from about 2 to about 5. In some aspects, the ethylene polymer can have a broad molecular weight distribution, with ratios of Mw/Mn that can range from as low as about 5, and up to about 50. For instance, the Mw/Mn of the ethylene polymer can be in a range from about 5 to about 40, from about 6 to about 45, from about 7 to about 35, from about 12 to about 45, or from about 15 to about 40.

In an aspect, ethylene polymers described herein can have a weight-average molecular weight (Mw) in a range from about 100,000 to about 750,000 g/mol, from about 100,000 to about 300,000 g/mol, or from about 150,000 to about 750,000 g/mol. In another aspect, ethylene polymers described herein can have a Mw in a range from about 175,000 to about 750,000 g/mol, from about 175,000 to about 500,000 g/mol, from about 250,000 to about 750,000 g/mol, or from about 250,000 to about 600,000 g/mol.

In one aspect, ethylene polymers of this invention can have a unimodal molecular weight distribution (as determined using gel permeation chromatography (GPC) or other suitable analytical technique). In a unimodal molecular weight distribution, there is a single identifiable peak. However, in another aspect, the ethylene polymer can have a bimodal molecular weight distribution, and in yet another aspect, a multimodal molecular weight distribution.

Moreover, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

The ethylene polymer can be produced using a metallocene-based catalyst system, a Ziegler-Natta based catalyst system, a chromium-based catalyst system, a titanated chromium-based catalyst system, or a combination thereof. In one aspect, the ethylene polymer can be produced using a metallocene-based catalyst system, while in another aspect, the ethylene polymer can be produced using a Ziegler-Natta based catalyst system, and in yet another aspect, the ethylene polymer can be produced using a chromium-based catalyst system, and in still another aspect, the ethylene polymer can be produced using a titanated chromium-based catalyst system. Accordingly, in one aspect, the ethylene polymer can be a metallocene-based ethylene polymer (the transition metal-based catalyst system comprises a metallocene compound). In another aspect, the ethylene polymer can be a Ziegler-Natta based ethylene polymer (the transition metal-based catalyst system comprises a Ziegler-Natta catalyst). In yet another aspect, the ethylene polymer can be a chromium-based ethylene polymer (the transition metal-based catalyst system comprises a chromium catalyst). In still another aspect, the ethylene polymer can be a titanated chromium-based ethylene polymer (the transition metal-based catalyst system comprises a titanated chromium catalyst).

Thus, depending upon the catalyst system used (e.g., Ziegler-Natta or titanated chromium), the ethylene polymer can contain no measureable amount of zirconium, and additionally or alternatively, no measurable amount of hafnium (e.g., the ethylene polymer can be produced using a catalyst system that does not contain hafnium or zirconium). No measurable amount means below the level of detection. For example, the ethylene polymer can contain, independently, less than 0.2 ppm (by weight), less than 0.1 ppm, less than 0.08 ppm, or less than 0.05 ppm, of hafnium and/or zirconium.

Likewise, if the catalyst system is certain metallocene-based or chromium-based catalyst systems, the ethylene polymer can contain no measurable amount of titanium (e.g., the ethylene polymer can be produced using a catalyst system that does not contain titanium), where no measurable amount means below the level of detection. For example, the ethylene polymer can contain less than 0.2 ppm (by weight), less than 0.1 ppm, less than 0.08 ppm, or less than 0.05 ppm, of titanium.

Similarly, if the catalyst system is certain metallocene-based or Ziegler Nana-based catalyst systems, the ethylene polymer can contain no measurable amount of chromium (e.g., the ethylene polymer can be produced using a catalyst system that does not contain chromium), where no measurable amount means below the level of detection. For example, the ethylene polymer can contain less than 0.2 ppm (by weight), less than 0.1 ppm, less than 0.08 ppm, or less than 0.05 ppm, of chromium.

Additionally, depending upon the catalyst system, the ethylene polymer can contain no measureable amount of magnesium (e.g., the ethylene polymer can be produced using a catalyst system that does not contain magnesium). For example, the ethylene polymer can contain less than 5 ppm (by weight), less than 1 ppm, less than 0.5 ppm, or less than 0.1 ppm, of magnesium.

Conversely, if the catalyst system used to produce the ethylene polymer contains zirconium (or hafnium, or titanium, or chromium), then the ethylene polymer can contain, for instance, an amount (in ppm by weight) of zirconium (or hafnium, or titanium, or chromium, independently) that often ranges from about 0.5 ppm to about 15 ppm, from about 0.5 ppm to about 10 ppm, from about 1 ppm to about 15 ppm, or from about 1 ppm to about 10 ppm, of zirconium (or hafnium, or titanium, or chromium, independently).

The ethylene polymer, in such aspects of the invention, can be categorized as a titanated chromium-based ethylene polymer. While not wishing to be bound by the following theory, it is believed that the particular molecular weight distribution, long and short chain branching distribution, polymer unsaturation characteristics, and catalyst residuals of titanated chromium-based ethylene polymers make them more susceptible to color formation when a phenolic antioxidant is present, to a much greater extent than ethylene polymers produced using metallocene or Ziegler-Natta catalyst systems.

Illustrative examples of suitable ethylene polymers that can be used in the polymer compositions disclosed herein, and can benefit from improved color (initial color, aged color, or multi-pass extrusion color) include chromium-catalyzed ethylene polymers and titanated chromium-based ethylene polymers, such as can be produced in slurry polymerization reactors (e.g., loop slurry reactors).

In accordance with an aspect of this invention, the ethylene polymer can be described by its unsaturation characteristics. For example, the ratio of (vinylene+trisubstituted+vinylidene groups)/vinyl groups of the polymer (amounts per million total carbon atoms) can fall within a range from about 0.15 to about 0.7; alternatively, from about 0.15 to about 0.6; alternatively, from about 0.15 to about 0.5; alternatively, from about 0.15 to about 0.45; alternatively, from about 0.18 to about 0.6; alternatively, from about 0.18 to about 0.5; alternatively, from about 0.18 to about 0.45; or alternatively, from about 0.21 to about 0.41.

Additionally or alternatively, the ethylene polymer can be characterized by a ratio of (vinylene+trisubstituted+vinylidene groups)/total unsaturated groups of the polymer (amounts per million total carbon atoms) within a range from about 0.12 to about 0.5, from about 0.12 to about 0.4, from about 0.12 to about 0.35, from about 0.14 to about 0.5, from about 0.14 to about 0.4, from about 0.14 to about 0.35, from about 0.16 to about 0.45, from about 0.16 to about 0.35, or from about 0.18 to about 0.29.

Additive Systems

The additive system employed in the polymer composition also can be referred to as an additive package or an additive composition, and can contain a glycerol stearate and an antioxidant comprising a phenolic antioxidant, a phosphite antioxidant, a thioester antioxidant, or any combination thereof. In one aspect, the additive system can contain a glycerol stearate and a phenolic antioxidant, while in another aspect, the additive system can contain a glycerol stearate and a phosphite antioxidant, and in another aspect, the additive system can contain a glycerol stearate and a thioester antioxidant, and in another aspect, the additive system can contain a glycerol stearate, a phenolic antioxidant, and a phosphite antioxidant, and in yet another aspect, the additive system can contain a glycerol stearate, a phosphite antioxidant, and thioester antioxidant, and in still another aspect, the additive system can contain a glycerol stearate, a phenolic antioxidant, a phosphite antioxidant, and a thioester antioxidant.

One or more than one glycerol stearate can be present in the additive system, one or more than one phenolic antioxidant can be present in the additive system, one or more than one phosphite antioxidant can be present in the additive system, and one or more than one thioester antioxidant can be present in the additive system. If present, the phosphite antioxidant can be a monophosphite antioxidant, a diphosphite antioxidant, or a polyphosphite antioxidant, as well as any combination of these phosphite antioxidants.

In one aspect of the invention, the polymer composition contains glycerol monostearate (GMS), while in another aspect, the polymer composition contains glycerol distearate, and in yet another aspect, the polymer composition contains both glycerol monostearate and glycerol distearate. In some aspects of this invention, at least about 50 wt. % of the glycerol stearate is glycerol monostearate. Thus, for example, at least about 65 wt. %, at least about 75 wt. %, at least about 85 wt. %, at least about 95 wt. %, or at least about 99 wt. %, of the glycerol stearate can be glycerol monostearate (GMS).

While not being limited thereto, the amount of glycerol stearates in the polymer composition (individually if only one is present, or a total if more than one is present) often ranges from about 50 ppm to about 1500 ppm. Illustrative and non-limiting ranges for the amount of glycerol stearate (for instance, GMS) in the polymer composition can include from about 100 ppm to about 1250 ppm, from about 100 ppm to about 850 ppm, from about 150 ppm to about 1000 ppm, from about 150 ppm to about 500 ppm, from about 200 ppm to about 1500 ppm, from about 200 ppm to about 500 ppm, and the like.

Likewise, the amount of the antioxidant (or antioxidants) in the polymer composition is not particularly limited. For example, the total amount of phenolic antioxidant(s), phosphite antioxidant(s), and thioester antioxidant(s) that can be present often falls within a range from about 250 ppm to about 7500 ppm; alternatively, from about 500 ppm to about 5000 ppm; alternatively, from about 500 ppm to about 3500 ppm; alternatively, from about 750 ppm to about 5000 ppm; or alternatively, from about 750 ppm to about 2500 ppm.

When a phenolic antioxidant is present in the composition, either alone or with a phosphite and/or thioester antioxidant, the amount of the phenolic antioxidant (or the total amount if more than one phenolic antioxidant) in the polymer composition is not particularly limited. For example, the phenolic antioxidant can be present at an amount in a range from about 200 ppm to about 3500 ppm; alternatively, from about 200 ppm to about 2500 ppm; alternatively, from about 350 ppm to about 2000 ppm; alternatively, from about 500 ppm to about 2000 ppm; or alternatively, from about 500 ppm to about 1000 ppm.

Any suitable phenolic antioxidant, or combination of phenolic antioxidants, can be used in the polymer composition. In one aspect, the phenolic antioxidant can comprise IRGANOX™ 1010 (pentaerythritol tetrakis(3-(3,5-di-tert-butyl-4-hydroxyphenyl) propionate), IRGANOX™ 1076 (octadecyl-3-(3,5-di-tertbutyl-4-hydroxyphenyl) propionate), IRGANOX™ 1330 (1,3,5-trimethyl-2,4,6-tris(3,5-di-tert-butyl-4-hydroxybenzyl)benzene), IRGANOX™ 3114 (tris(3,5-di-tert-butyl-4-hydroxybenzyl) isocyanurate), IRGANOX™ 129 (2,2'-ethylidenebis(4,6-di-tert-butylphenol)), IRGANOX™ MD 1024 (1,2-bis(3,5-di-tert-butyl-4-hydroxy hydrocinnamoyl) hydrazine), and the like, or any combination thereof. Other suitable phenolic antioxidants are known to those of skill in the art, and likewise can be used in the polymer compositions encompassed herein.

When a phosphite antioxidant is present in the composition, either alone or with a phenolic and/or thioester antioxidant, the amount of the phosphite antioxidant (or the total amount if more than one phosphite antioxidant) in the polymer composition is not particularly limited. For example, the phosphite antioxidant can be present at an amount in a range from about 500 ppm to about 5000 ppm; alternatively, from about 500 ppm to about 3500 ppm; alternatively, from about 500 ppm to about 2000 ppm; alternatively, from about 750 ppm to about 5000 ppm; alternatively, from about 750 ppm to about 3500 ppm; or alternatively, from about 750 ppm to about 2000 ppm.

The phosphite antioxidant can comprise a monophosphite antioxidant, a diphosphite antioxidant, a polyphosphite antioxidant, or any combination thereof. Thus, a monophosphite antioxidant can be present in the additive system (or polymer composition); alternatively, a diphosphite antioxidant; alternatively, a polyphosphite antioxidant; alternatively, a monophosphite antioxidant and a diphosphite antioxidant; alternatively, a monophosphite antioxidant and a polyphosphite antioxidant; alternatively, a diphosphite antioxidant and a polyphosphite antioxidant; or alternatively, a monophosphite antioxidant, a diphosphite antioxidant, and a polyphosphite antioxidant.

Any suitable monophosphite antioxidant, or combination of monophosphite antioxidants, can be used in the polymer composition. In some aspects, the monophosphite antioxidant can comprise IRGAFOS™ 168 (tris(2,4,6-di-tert-butylphenyl)phosphite), HP-10 (2,2'-methylenebis(2,4-di-tert-butylphenyl) 2-ethylhexyl phosphite), and the like, or any combination thereof. Other suitable monophosphite antioxidants are known to those of skill in the art, and likewise can be used in the polymer compositions encompassed herein.

When used, the amount of the monophosphite antioxidant (or antioxidants) in the polymer composition, generally, can vary over the 200 ppm to 5000 ppm range. More typically, the monophosphite antioxidant can be present in the polymer composition at an amount in a range from about 200 ppm to about 3000 ppm, from about 500 ppm to about 2000 ppm, from about 750 ppm to about 3000 ppm, or from about 1000 ppm to about 2500 ppm, and the like.

Any suitable diphosphite antioxidant, or combination of diphosphite antioxidants, can be used in the polymer composition. In some aspects, the diphosphite antioxidant can comprise ULTRANOX™ 627A (bis(2,4-di-t-butylphenyl) pentaerythritol diphosphite plus stabilizer), ULTRANOX™ 626 (bis(2,4-di-t-butylphenyl) pentaerythritol diphosphite), PEP-36 (bis(2,6-di-tert-butyl-4-methylphenyl) pentaerythritol diphosphate), DOVERPHOS™ 9228 (bis(2,4-dicumylphenyl) pentaerythritol diphosphate), DOVERPHOS™ S9228T (bis(2,4-dicumylphenyl) pentaerythritol diphosphite plus stabilizer), and the like, or any combination thereof. Other suitable diphosphite antioxidants are known to those of skill in the art, and likewise can be used in the polymer compositions encompassed herein.

When used, the amount of the diphosphite antioxidant (or antioxidants) in the polymer composition typically can encompass the same ranges as that of the monophosphite antioxidant, disclosed hereinabove. If both a diphosphite and monophosphite antioxidant are present in the polymer composition, then the weight ratio of the diphosphite antioxidant to the monophosphite antioxidant (diphosphite:monophosphite) in the polymer composition often can fall within a range from about 10:1 to about 1:10. More typically, the weight ratio of diphosphite:monophosphite can be in a range from about 5:1 to about 1:5, from about 2:1 to about 1:2, from about 1.5:1 to about 1:1.5, or from about 1.2:1 to about 1:1.2, and the like.

Any suitable polyphosphite antioxidant, or combination of polyphosphite antioxidants, can be used in the polymer composition. In some aspects, the polyphosphite antioxidant can comprise LGP 11, Weston 705, and the like, or any combination thereof. Other suitable polyphosphite antioxidants are known to those of skill in the art, and likewise can be used in the polymer compositions encompassed herein. When used, the amount of the polyphosphite antioxidant (or antioxidants) in the polymer composition typically can encompass the same ranges as that of the monophosphite antioxidant, disclosed hereinabove.

When a thioester antioxidant is present in the composition, either alone or with a phenolic and/or phosphite antioxidant, the amount of the thioester antioxidant (or the total amount if more than one thioester antioxidant) in the polymer composition is not particularly limited. For example, the thioester antioxidant can be present at an amount in a range from about 20 ppm to about 2000 ppm; alternatively, from about 20 ppm to about 1500 ppm; alternatively, from about 40 ppm to about 1000 ppm; alternatively, from about 40 ppm to about 500 ppm; alternatively, from about 50 ppm to about 350 ppm; or alternatively, from about 50 ppm to about 250 ppm.

Any suitable thioester antioxidant, or combination of thioester antioxidants, can be used in the polymer composition. In some aspects, the thioester antioxidant can comprise DSTDP (distearyl thiodipropionate), DLTDP (dilauryl thiodipropionate), and the like, or any combination thereof. Other suitable thioester antioxidants are known to those of skill in the art, and likewise can be used in the polymer compositions encompassed herein.

Consistent with aspects of this invention, the antioxidant can comprise a phenolic antioxidant, a phosphite antioxidant, a thioester antioxidant, or any combination thereof. For instance, the polymer composition can contain a combination of antioxidants, such as a phenolic antioxidant and a phosphite antioxidant; alternatively, a phenolic antioxidant and a monophosphite antioxidant; alternatively, a thioester antioxidant and a phosphite antioxidant; or alternatively, a thioester antioxidant and a monophosphite antioxidant.

The additive system (or additive package, or additive composition) can be in any suitable form for combining with the ethylene polymer to result in the polymer compositions disclosed herein. Two such forms of the additive system are a masterbatch composition and an additive blend composition, and these compositions are encompassed herein. The masterbatch composition generally contains a carrier resin and an additive mixture, and the additive mixture can comprise a glycerol stearate and an antioxidant comprising a phenolic antioxidant, a phosphite antioxidant, a thioester antioxidant, or any combination thereof. The glycerol stearate, phenolic antioxidant, phosphite antioxidant, and thioester antioxidant in the additive mixture can be any glycerol stearate, phenolic antioxidant, phosphite antioxidant, and thioester antioxidant disclosed herein. In the additive mixture, the weight ratio of glycerol stearate:antioxidant generally falls within a range from about 6:1 to about 1:150. This ratio is based on the total weight of glycerol stearate(s) and the total weight of antioxidant(s) (phenolic, phosphite, and thioester antioxidants) present in the additive mixture. The amount of the carrier resin in the masterbatch composition is not particularly limited, but the weight ratio of carrier resin:additive mixture often ranges from about 95:5 to about 20:80, such as from about 95:5 to about 50:50, or from about 50:50 to about 20:80, and the like. Thus, the masterbatch composition can contain 95 wt. % carrier resin and 5 wt. % additive mixture in one aspect, and 20 wt. % carrier resin and 80 wt. % additive mixture in another aspect.

Any suitable carrier resin can be used in the masterbatch composition. In some instances, the carrier resin is the same as the ethylene polymer that the masterbatch composition is combined with to form the polymer composition. However, often the carrier resin is different, and thus any suitable ethylene homopolymer (inclusive of LDPE) or ethylene copolymer can be used, and the carrier resin can have any suitable melt index (or other melt flow property), any suitable density, and any suitable molecular weight distribution (e.g., unimodal or bimodal). Moreover, the carrier resin is not limited to ethylene-based polymers; the carrier resin also can be any suitable propylene-based polymer, such as a polypropylene homopolymer or a propylene-based copolymer.

The masterbatch composition can be in any suitable form, but generally, the masterbatch composition is in the form of pellets. Accordingly, the pelleted masterbatch composition can be mixed or combined with the ethylene polymer and melt processed together—for example, in an extrusion system—to form the polymer composition, also often in the form of pellets.

Optionally, the masterbatch composition (or the additive mixture) can further comprise at least one other additive, illustrative examples of which can include an antiblock additive, a slip additive, a colorant, a filler, a UV additive, an anti-stat additive, a processing aid, an acid scavenger, a carbon centered radical scavenger, and the like, or any combination thereof.

Referring now to the additive blend composition, this composition can contain at least about 95 wt. % of the additive mixture (as described above, comprising a glycerol stearate and an antioxidant comprising a phenolic antioxidant, a phosphite antioxidant, a thioester antioxidant, or any combination thereof), and less than or equal to about 3 wt. % of an ethylene polymer, a propylene polymer, or any combination thereof. In most instances, the additive blend composition contains less than or equal to about 1 wt. % of the polymer components, and often contains no measurable amount of a polymer component, and thus, the additive blend composition is often referred to as a neat composition—all or substantially all of the additive blend composition is an active additive component. As with the masterbatch composition, the weight ratio of glycerol stearate:antioxidant in the additive blend composition can range from about 6:1 to about 1:150.

In some aspects, at least about 97 wt. %, at least about 98 wt. %, at least about 99 wt. %, or all of the additive blend composition is the additive mixture. If a binding agent is needed to prepare the additive blend composition, any suitable binding agent can be used, often at levels of 3-4 wt. % or less, or 1-2 wt. % or less, based on the total weight of the additive blend composition. Various oils and waxes can be used as the binding agent, such as mineral oil.

The additive blend composition can be in any suitable form, such as in powder form, pellet form, bead form (oval or generally spherical), and the like. Similar to the masterbatch composition, the additive blend composition can be mixed or combined with the ethylene polymer and melt processed together—for example, in an extrusion system—to form the polymer composition, often in the form of pellets.

Also similar to the masterbatch composition, the additive blend composition (or the additive mixture) can further comprise at least one other additive, such as an antiblock additive, a slip additive, a colorant, a filler, a UV additive, an anti-stat additive, a processing aid, an acid scavenger, a carbon centered radical scavenger, and the like, or any combination thereof.

In both the masterbatch composition and the additive blend composition, the weight ratio of glycerol stearate:antioxidant generally is in a range from about 6:1 to about 1:150. In one aspect, the weight ratio can be from about 3:1 to about 1:75, while in another aspect, the weight ratio can be from about 2:1 to about 1:50, and in yet another aspect, the weight ratio can be from about 1:1 to about 1:35, and in still another aspect, the weight ratio can be from about 1:1.5 to about 1:15.

The additive mixture in both the masterbatch composition and the additive blend composition can contain a glycerol stearate and an antioxidant comprising a phenolic antioxidant, a phosphite antioxidant, a thioester antioxidant, or any combination thereof. In one aspect, the additive mixture can contain a glycerol stearate and a phenolic antioxidant, while in another aspect, the additive mixture can contain a glycerol stearate and a phosphite antioxidant, and in another aspect, the additive mixture can contain a glycerol stearate and a thioester antioxidant, and in another aspect, the additive mixture can contain a glycerol stearate, a phenolic antioxidant, and a phosphite antioxidant (e.g., a monophosphite antioxidant), and in yet another aspect, the additive system can contain a glycerol stearate, a phosphite antioxidant, and thioester antioxidant, and in still another aspect, the additive system can contain a glycerol stearate, a phenolic antioxidant, a phosphite antioxidant, and a thioester antioxidant. In these and other aspects, the glycerol stearate can comprise glycerol monostearate (GMS), and in some instances, at least about 50 wt. %, at least about 85 wt. %, or at least about 95 wt. %, of the glycerol stearate is GMS.

Catalyst Systems and Polymerization Processes

As disclosed herein, the ethylene polymer can be produced using a metallocene-based catalyst system, a Ziegler-Natta based catalyst system, a chromium-based catalyst system, a titanated chromium-based catalyst system, or a combination thereof. An illustrative polymerization process can comprise contacting any suitable transition metal-based catalyst system, or any transition metal-based catalyst system disclosed herein, with ethylene and an optional olefin comonomer under polymerization conditions in a polymerization reactor system to produce the ethylene polymer.

In a particular aspect of the present invention, the ethylene polymer can be produced using a chromium-based catalyst system. The chromium-based catalyst system can contain a titanated chromium catalyst in aspects of this invention. Illustrative examples of such catalysts include MAGNAPORE™ 963, MAGNAPORE™ 964, and the like. Other suitable chromium catalysts are known to those of skill in the art, and likewise can be used to produce the ethylene polymer encompassed herein.

The transition metal-based catalyst system, in addition to the transition metal component, also can contain a co-catalyst. When present, the co-catalyst can include, but is not limited to, metal alkyl, or organometal, co-catalysts, with the metal encompassing boron, aluminum, and the like. Optionally, the catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Further, aluminoxane compounds, organoboron or organoborate compounds, ionizing ionic compounds, activator-supports (chemically-treated solid oxides), and the like, or combinations thereof, can be used in the transition metal-based catalyst system.

Ethylene polymers can be produced from the transition metal-based catalyst system using any suitable olefin polymerization process using various types of polymerization reactors, polymerization reactor systems, and polymerization reaction conditions. As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the ethylene polymer. A suitable polymerization temperature can be any temperature below the de-polymerization temperature according to the Gibbs Free energy equation. Typically, this includes from about 60° C. to about 280° C., for example, or from about 60° C. to about 185° C., depending upon the type of polymerization reactor(s). In some reactor systems, the polymerization temperature generally can be within a range from about 60° C. to about 115° C., or from about 130° C. to about 180° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages to the polymerization reaction process.

Olefin comonomers that can be employed with catalyst compositions and polymerization processes of this invention typically can include olefin compounds having from 3 to 20 carbon atoms per molecule and having at least one olefinic double bond. In an aspect, the olefin comonomer can comprise a $C_3$-$C_{20}$ olefin; alternatively, a $C_3$-$C_{20}$ α-olefin; alternatively, a $C_3$-$C_{10}$ olefin; alternatively, a $C_3$-$C_{10}$ α-olefin; alternatively, the olefin comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Accordingly, the ethylene polymer of this invention can comprise an ethylene/α-olefin copolymer and/or an ethylene homopolymer. In some aspects, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof or alternatively, an ethylene/1-hexene copolymer.

Polymer Compositions

Polymer compositions having improved color—initial color and/or aged color and/or multi-pass extrusion color—are disclosed herein. One such polymer composition can comprise an ethylene polymer, from about 50 ppm to about 1500 ppm of a glycerol stearate, and from about 250 ppm to about 7500 ppm of an antioxidant comprising a phenolic antioxidant, a phosphite antioxidant, a thioester antioxidant, or any combination thereof.

The present invention also encompasses methods for improving the color—improving the initial color, and/or improving the aged color (improving the color after long-term aging or reducing aged color formation), and/or improving the multi-pass extrusion color (improving color after multi-pass extrusion processing or reducing color formation from multi-pass extrusion processing)—of a polymer composition. One such method can comprise combining an ethylene polymer with an additive system to form the polymer composition, and in this method, the additive system can comprise a glycerol stearate and an antioxidant. The resultant polymer composition can contain from about 50 ppm to about 1500 ppm of the glycerol stearate, and from about 250 ppm to about 7500 ppm of an antioxidant comprising a phenolic antioxidant, a phosphite antioxidant, a thioester antioxidant, or any combination thereof.

The present invention also encompasses processes for producing polymer compositions with improved color—initial color and/or aged color and/or multi-pass extrusion color. One such process can comprise (a) contacting a transition metal-based catalyst system with ethylene and an optional olefin comonomer under polymerization conditions in a polymerization reactor system to produce an ethylene polymer, and (b) combining the ethylene polymer with an additive system to form the polymer composition. In this process, the additive system can comprise a glycerol stearate and an antioxidant. The resultant polymer composition can contain from about 50 ppm to about 1500 ppm of the glycerol stearate, and from about 250 ppm to about 7500 ppm of an antioxidant comprising a phenolic antioxidant, a phosphite antioxidant, a thioester antioxidant or any combination thereof.

Generally, the features of the polymer compositions, methods, and processes disclosed herein (for example, the characteristics of the ethylene polymer, the amount of the glycerol stearate, the amount of the antioxidant(s), and the specific phenolic, phosphite, and thioester antioxidants and (if used) their respective loadings, among others) are independently described herein and these features can be combined in any combination to further describe the disclosed compositions, methods, and processes. Moreover, other steps can be conducted before, during, and/or after any of the steps listed in the disclosed methods and processes, unless stated otherwise.

Consistent with aspects of this invention, the polymer composition can be in the form of pellets, often referred to as polymer resin pellets. Moreover, in addition to the additive system (glycerol stearate and the particular antioxidants), the polymer composition also can contain other additives, non-limiting examples of which can include an antiblock additive, a slip additive, a colorant, a filler, a UV additive (e.g., UV inhibitors and HALS additives), an antistat additive, a processing aid (e.g., fluoroelastomers), an acid scavenger, a carbon centered radical scavenger (e.g., hydroxylamines), and the like, as well as any combination thereof.

The additive system can be combined with the ethylene polymer (and any additional additives, such as slip or antiblock, can be combined with the ethylene polymer) using any suitable technique, and at any time after formation of the ethylene polymer in a polymerization process and prior to fabrication into an article of manufacture. Exemplary methods of combining the additive system with the ethylene polymer component include, but are not limited to, blending, mixing, melt processing, extruding, and the like, or combinations thereof. The additive system can be pre-blended together and then combined with the ethylene polymer, or each additive can be combined individually with the ethylene polymer. For instance, the additive system can be combined with the ethylene polymer after polymerization, but prior to pelletizing of the ethylene polymer resin, such as in a pelletizing extruder (e.g., single screw extrusion, twin screw extrusion, etc.). The present invention is not limited to any particular method of forming the polymer compositions disclosed herein.

The polymer compositions disclosed herein, and polymer compositions produced by any method or process disclosed herein, can have improved initial color, improved aged color, or improved multi-pass extrusion color, or any combination of two or more of these improvements. In one aspect, the polymer compositions (e.g., resin pellets) can have superior initial color, such as more whiteness and less off-color (e.g., yellowing, pinking). Additionally or alternatively, the polymer compositions (e.g., resin pellets) can have improved aged color; the color is superior after long-term aging, or there is a reduction in color formation after aging. Accordingly, resin pellets made from the polymer compositions disclosed herein can be stored for long periods of time at ambient conditions without unacceptable color formation (e.g., yellowing). Additionally or alternatively, the polymer compositions (e.g., resin pellets) can have improved multi-pass extrusion color; the color is superior after multi-pass extrusion processing or there is a reduction in color formation after multi-pass extrusion processing. Accordingly, resin pellets made from the polymer compositions disclosed herein can have excellent high-temperature processing stability without unacceptable yellow/off-color formation, which is generally quantified in multi-pass extrusion experiments.

Referring first to initial color (prior to aging), the polymer compositions disclosed herein can have an initial PE color number of at least 200, and in some instances, at least 250, at least 275, at least 290, or at least 300. Generally, a polymer having a PE color number of 180 or less will have a yellow off-color that is visually noticeable.

Also surprisingly, the polymer compositions of this invention can have an initial PE color number that is greater than that or within 50 of (or within 40 of, or within 20 of) a comparable (an otherwise equivalent) polymer composition that contains 200-700 ppm (e.g., 200 ppm, or 300 ppm, or 500 ppm, and so forth) by weight of a diphosphite antioxidant instead of the glycerol stearate. This comparison is meant to be under the same time-temperature conditions, such that the only difference is the glycerol stearate present in the polymer composition versus the diphosphite antioxidant in the polymer composition.

Referring now to aged color, practical aged color performance for the polymer compositions disclosed herein extends for 3 months or more, or even 6 months or more, and at ambient temperatures typically ranging from 25 to 45° C., and in the presence or absence of light. To accelerate any time-dependent color formation, testing is typically conducted at higher temperatures (80° C.), as demonstrated in the examples that follow (see FIGS. 2, 5, 7, 9, 10, and 12). In accordance with aspects of this invention, the polymer composition can have an aged PE color number of at least 200, and in some instances, at least 220, at least 240, at least 260, or at least 280 after storage for 3 weeks (or for 4 weeks, or for 6 weeks, or for 8 weeks) at a temperature of 80° C. Since these time-temperature conditions are designed to simulate long-term color stability at lower temperatures, but are accelerated to obtain test data more quickly, the polymer compositions are stored in (or exposed to) an ambient/air atmosphere (i.e., not an inert atmosphere).

Also surprisingly, the polymer compositions of this invention can have an aged PE color number that is greater than that or within 50 of (or within 40 of, or within 20 of) a comparable (an otherwise equivalent) polymer composition that contains 200-700 ppm (e.g., 200 ppm, or 300 ppm, or 500 ppm, and so forth) by weight of a diphosphite antioxidant instead of the glycerol stearate. As above, this comparison is meant to be under the same time-temperature conditions, such that the only difference is the glycerol stearate present in the polymer composition versus the diphosphite antioxidant in the polymer composition.

Referring now to multi-pass extrusion color, high temperature processing stability for the polymer compositions disclosed herein is conducted in extrusion studies at 240° C. for one to five extrusion passes. In accordance with aspects of this invention, the polymer composition can have an multi-pass extrusion PE color number of at least 180, and in some instances, at least 200, at least 220, at least 240, or at least 260, after one extrusion pass (or 3 extrusion passes, or 5 extrusion passes) at a temperature of 240° C.

Also surprisingly, the polymer compositions of this invention can have a multi-pass PE color number that is greater than that or within 50 of (or within 40 of, or within 20 of) a comparable (an otherwise equivalent) polymer composition that contains 200-700 ppm (e.g., 200 ppm, or 300 ppm, or 500 ppm, and so forth) by weight of a diphosphite antioxidant instead of the glycerol stearate. As above, this comparison is meant to be under the same time-temperature conditions, such that the only difference is the glycerol stearate present in the polymer composition versus the diphosphite antioxidant in the polymer composition.

The PE color number is described, for example, in U.S. Pat. No. 6,613,823, which is incorporated herein by reference in its entirety. A higher PE color number indicates a whiter polymer with less yellow/off-color, and can be calculated from Hunter "a", "b", and "L" values by the following formula:

$$PE\ color\ number = L(0.0382L - 0.056a - 0.3374b).$$

Articles of manufacture can be formed from, and/or can comprise, the polymer compositions of this invention and, accordingly, are encompassed herein. For example, articles which can comprise polymer compositions of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives (e.g., a slip additive, an antiblock additive) are often added to the polymer composition in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise (or be produced from) any of the polymer compositions described herein, and the article of manufacture can be or can comprise a film, a pipe, or a blow molded product.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Melt index (MI, g/10 min) can be determined in accordance with ASTM D1238 (2013) at 190° C. with a 2,160 gram weight, and high load melt index (HLMI, g/10 min) can be determined in accordance with ASTM D1238 (2013) at 190° C. with a 21,600 gram weight. Polymer density can be determined in grams per cubic centimeter (g/cm$^3$) on a compression molded sample, cooled at about 15° C. per hour, and conditioned for about 40 hours at room temperature in accordance with ASTM D1505 (2010) and ASTM D4703 (2016).

Molecular weights and molecular weight distributions can be obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) is set at 1 mL/min, and polymer solution concentrations are in the range of 1.0-1.5 mg/mL, depending on the molecular weight. Sample preparation is conducted at 150° C. for nominally 4 hr with occasional and gentle agitation and before the solutions are transferred to sample vials for injection. An injection volume of about 200 μL is used. The integral calibration method is used to deduce molecular weights and molecular weight distributions using a Chevron Phillips Chemical Company's HDPE polyethylene resin, MARLEX® BHB5003, as the broad standard. The integral table of the broad standard can be pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Initial Compounding: All formulations were compounded on a ZSK-30 twin screw extruder with a 30" screw length under a nitrogen purge. Powder form additives were bag blended with the respective ethylene polymer fluff prior to feeding into the extruder to form the initial polymer compositions. For aged color, samples of the extruded pellets were aged in a forced air oven at 80° C. for the time periods indicated in the respective examples.

Multi-pass extrusion: After receiving the initial samples from compounding, the formulations were processed on a Braebender single screw extruder under ambient atmosphere. The heating and screw speed were adjusted to obtain a melt temperature of 240° C. for the polymer strand (Zone 1=190° C., Zone 2=210° C., Zone 3=220° C., Zone 4=230° C., Screw RPM=50). The polymer strand was cooled in a water bath and pelletized.

Color measurements were analyzed on a Hunterlabs Labscan XE. This analysis provided Hunter "a" and Hunter "b" color values for each sample. The Hunter "a" value indicates color variation between red and green: negative Hunter "a" values indicate greenness, while positive Hunter "a" values indicate redness. The Hunter "b" value indicates color variation between blue and yellow: negative Hunter "b" numbers indicate blueness, while positive Hunter "b" values indicate yellowness. The Hunter "L" value indicates color variation between white and black: negative Hunter "L" values indicate blackness, while positive Hunter "L" values indicate whiteness. Hunter "a", "b", and "L" values were converted to a PE color number, in which a higher PE color number indicates a whiter polymer, by the following formula:

$$PE\ color\ number = L(0.0382L - 0.056a - 0.3374b).$$

Metals content, such as the amount of catalyst residue in the polymer composition, can be determined by ICP analysis on a PerkinElmer Optima 8300 instrument. Polymer samples can be ashed in a Thermolyne furnace with sulfuric acid overnight, followed by acid digestion in a HotBlock with HCl and HNO$_3$ (3:1 v:v).

NMR data for vinylene groups, trisubstituted groups, vinylidene groups, vinyl groups, and total unsaturated groups were determined as follows. Polymer samples were dissolved in deuterated NMR solvent 1,1,2,2-Tetrachloro-ethane-d2 (TCE-d2). The sample and solvent mixture was heated in a heating block at 130° C. for 4-5 hours. The mixture was occasionally stirred with a stainless-steel stirrer to ensure homogeneous mixing. The resulting solution was then left overnight (~15-16 hours) in the heating block to ensure complete disentanglement of the polymer chains. The final concentration of the samples was about 3 wt. %. The sample was equilibrated at 125° C. inside the probe for 15 minutes before data collection started.

Two different proton NMR data were collected for each sample: regular (control) and Presaturated proton NMR. The data were collected in a 500 MHz NMR instrument which is comprised of a 500 MHz Oxford magnet and a Bruker Avance III HD console. A Bruker 5 mm BBI probe equipped with z-gradient was used for the data collection. The data were processed with Bruker's Topspin software (version 3.2 pl 6).

Regular proton NMR data was collected with zg pulse sequence from Bruker's pulse sequence library using the following acquisition parameters: 5.0 s relaxation delay, 7.4 us pulse width, 14 W pulse power, 4 dummy scans, 5.0 s acquisition time, 1024 scans, and 9 ppm spectral window. The data was processed with 0.3 Hz line broadening and zero filled to 65k data points. The spectrum was referenced to the residual proton peak of TCE-d2 (6.0 ppm).

Presaturation proton NMR spectrum was collected with zgpr pulse sequence from Bruker's pulse sequence library using the following acquisition parameters: 5.0 s relaxation delay, 7.4 us pulse width, 14 W pulse power, 4 dummy scans, 5.0 s acquisition time, 1024 scans, and 20 ppm spectral window. The data was processed with 0.3 Hz line broadening and zero filled to 131k data points. The transmitter offset was placed at the center of the proton peak arising from the backbone proton atoms of polyethylene (PE) for efficient suppression of that peak. This PE backbone peak appears in between 1.40-1.35 ppm region. The spectrum was referenced to the residual proton peak of TCE-d2 (6.0 ppm).

In the regular and presaturation proton spectrum, the area under the solvent peak was calibrated to 100. The regular proton spectrum was integrated for the area of the solvent and the polymer peak (3.4-0.25 ppm). The Presaturation proton spectrum was integrated for the solvent and the internal and terminal olefin peaks. The integral area was normalized to 1000 in order to report the content of the olefin structure fragments per $10^6$ carbon atoms. The following equations were used to calculate the olefin contents (I=integral area, and N=number of species):

$$N_{CH2}=I_{polymer}/2$$

$$N_{vinylene}=I_{vinylene}/2$$

$$N_{trisub}=I_{trisub}$$

$$N_{vinyl}=I_{vinyl}/2$$

$$N_{vinylidene}=I_{vinylidene}/2$$

$$N_{olefin}/10^6C=N_{olefin}/N_{CH2}\times 10^6$$

Examples 1-2

In Example 1, a polymer composition was produced with a titanated-chromium based polyethylene (5.5 HLMI, 0.954 g/cc), 700 ppm of IRGANOX™ 1010, 500 ppm of IRGAFOS™ 168, and 500 ppm of DOVERPHOS™ 59228 T, while in Example 2, a polymer composition was produced with the titanated-chromium based polyethylene, 700 ppm of IRGANOX™ 1010, 500 ppm of IRGAFOS™ 168, and 300 ppm of glycerol monostearate (GMS).

FIG. 1 illustrates the initial PE Color Number for the polymer compositions of Examples 1-2 and multi-pass extrusion color after 1, 3, and 5 extrusion passes at 240° C. A higher PE color number reflects less yellow/off-color formation. Unexpectedly, the polymer composition of Example 2 (containing 300 ppm of GMS) had superior initial color and multi-pass extrusion color—after each pass—as compared to that of the polymer composition of Example 1 (containing 500 ppm of 59228T).

Figure 2:
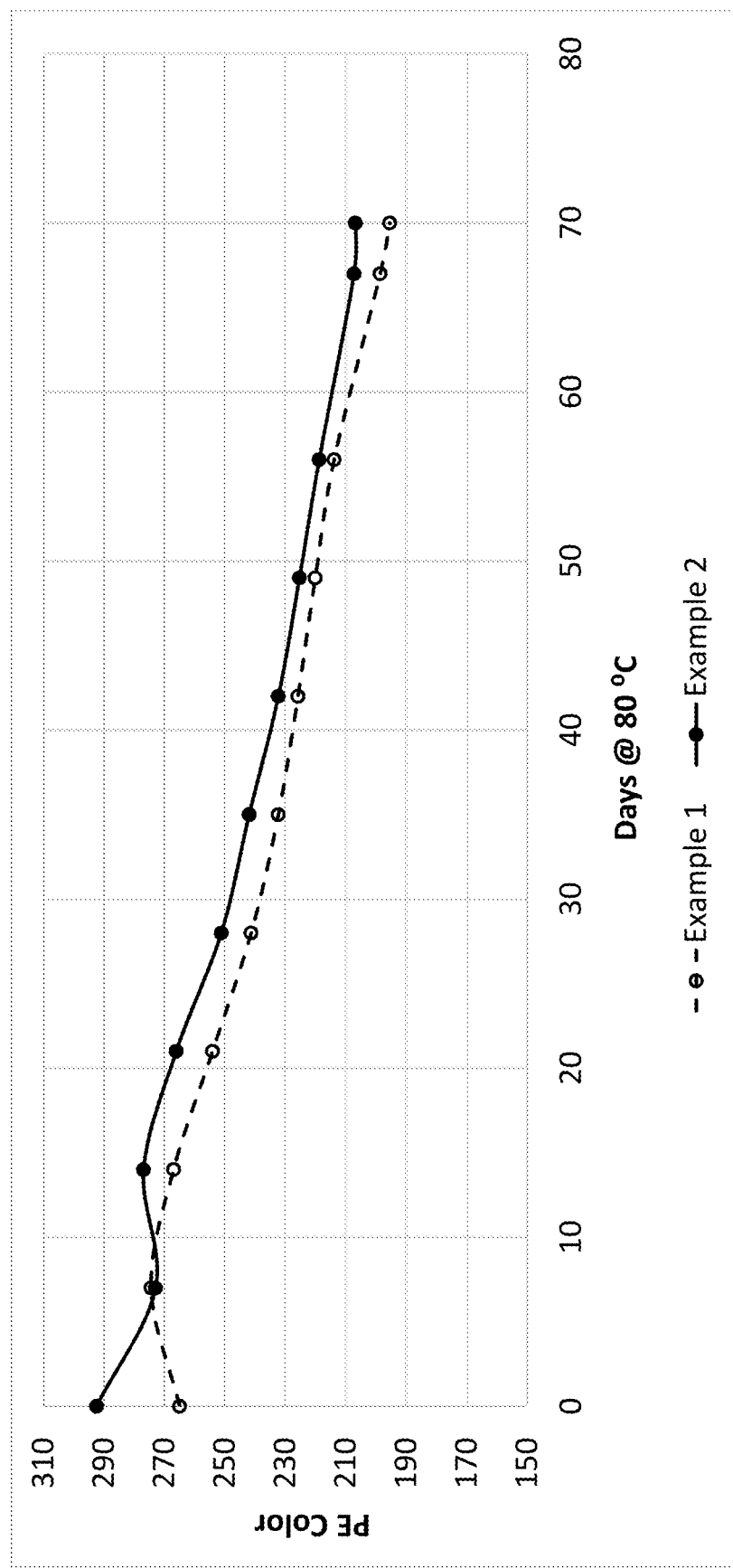
FIG. 2 presents a plot of the PE Color Number versus time at 80° C. for the pellets of the polymer compositions of Examples 1-2.
Figure 3:
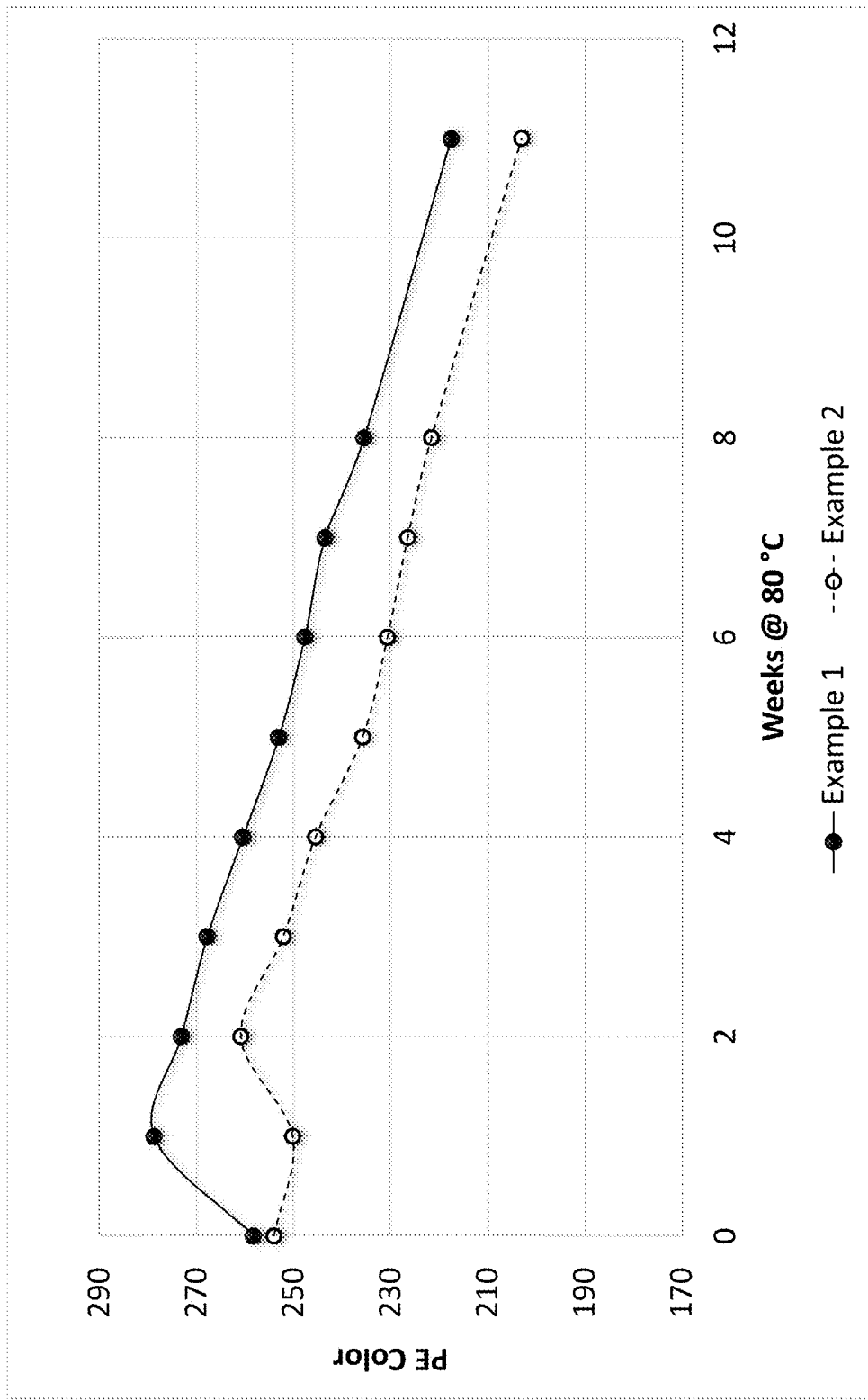
FIG. 3 presents a plot of the PE Color Number versus time at 80° C. for the 1st pass extrusion pellets of the polymer compositions of Examples 1-2.

FIG. 2 illustrates the PE Color Number for the pellets of the polymer compositions of Examples 1-2 after aging at 80° C. for 10 weeks, and FIG. 3 illustrates the PE Color Number for the 1st pass extrusion pellets of the polymer compositions of Examples 1-2 after aging at 80° C. for 11 weeks. Unexpectedly, as shown in FIG. 2, the polymer composition of Example 2 (initial pellets) had superior aged color for up to 10 weeks, as compared to the polymer composition of Example 1. As to the aged color of pellets subjected to 1 pass of extrusion processing, the aged color for Example 2 was less than that of Example 1, but generally within 20 PE color number units.

Examples 3-5

In Example 3, the polymer composition was produced with a chromium-based polyethylene (10 HLMI, 0.948 g/cc), 700 ppm of IRGANOX™ 1010, and 300 ppm of ULTRANOX™ 627A; the polymer composition of Example 4 was produced with the chromium-based polyethylene, 700 ppm of IRGANOX™ 1010, 500 ppm of IRGAFOS™ 168, and 500 ppm of DOVERPHOS™ 59228T; the polymer composition of Example 5 was produced with the chromium-based polyethylene, 700 ppm of IRGANOX™ 1010, 500 ppm of IRGAFOS™ 168, and 300 ppm of glycerol monostearate (GMS).

Figure 4:
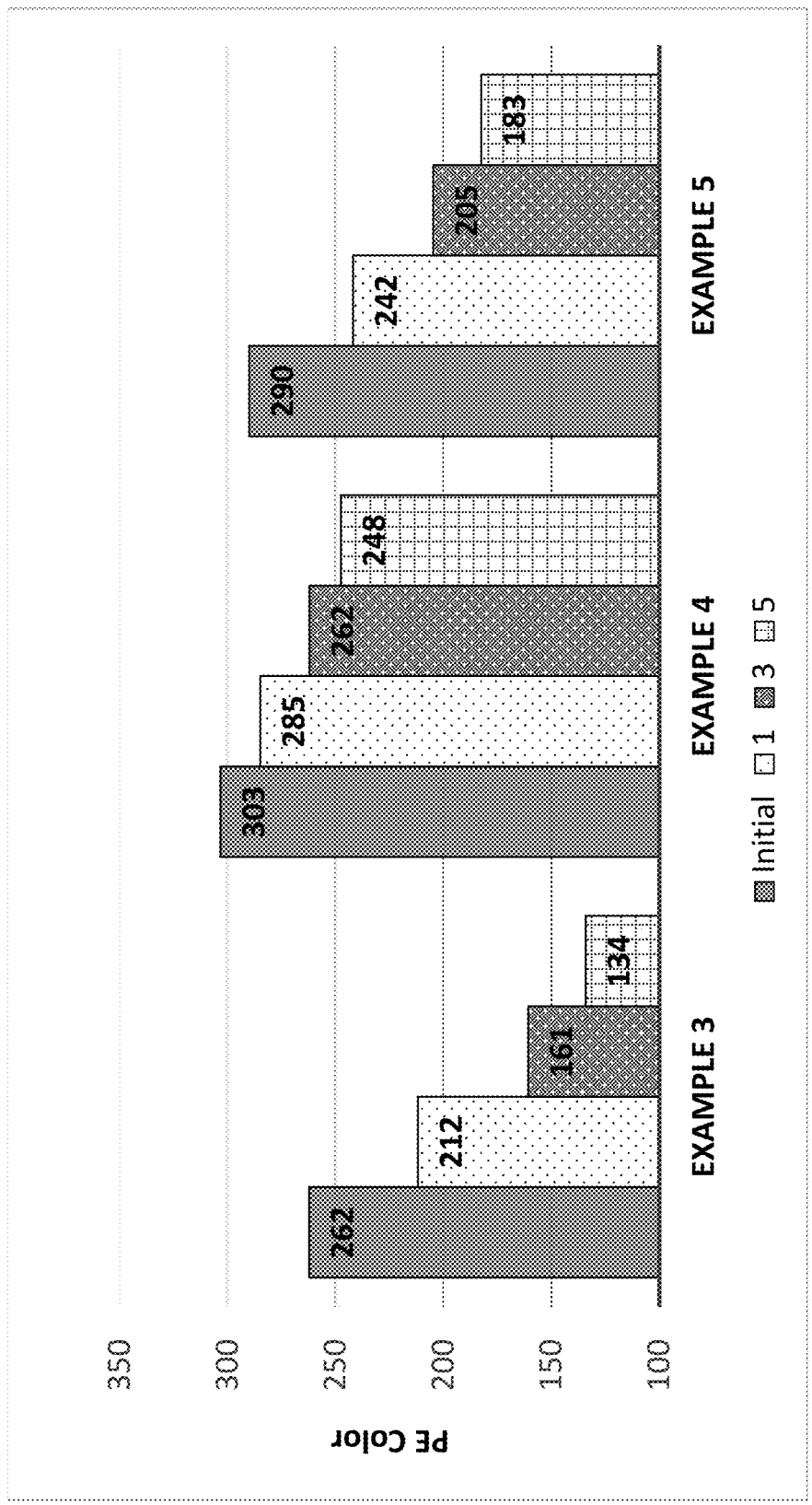
FIG. 4 presents a plot of the initial PE Color Number and multi-pass extrusion color after 1, 3, and 5 extrusion passes at 240° C. for the polymer compositions of Examples 3-5.
Figure 5:
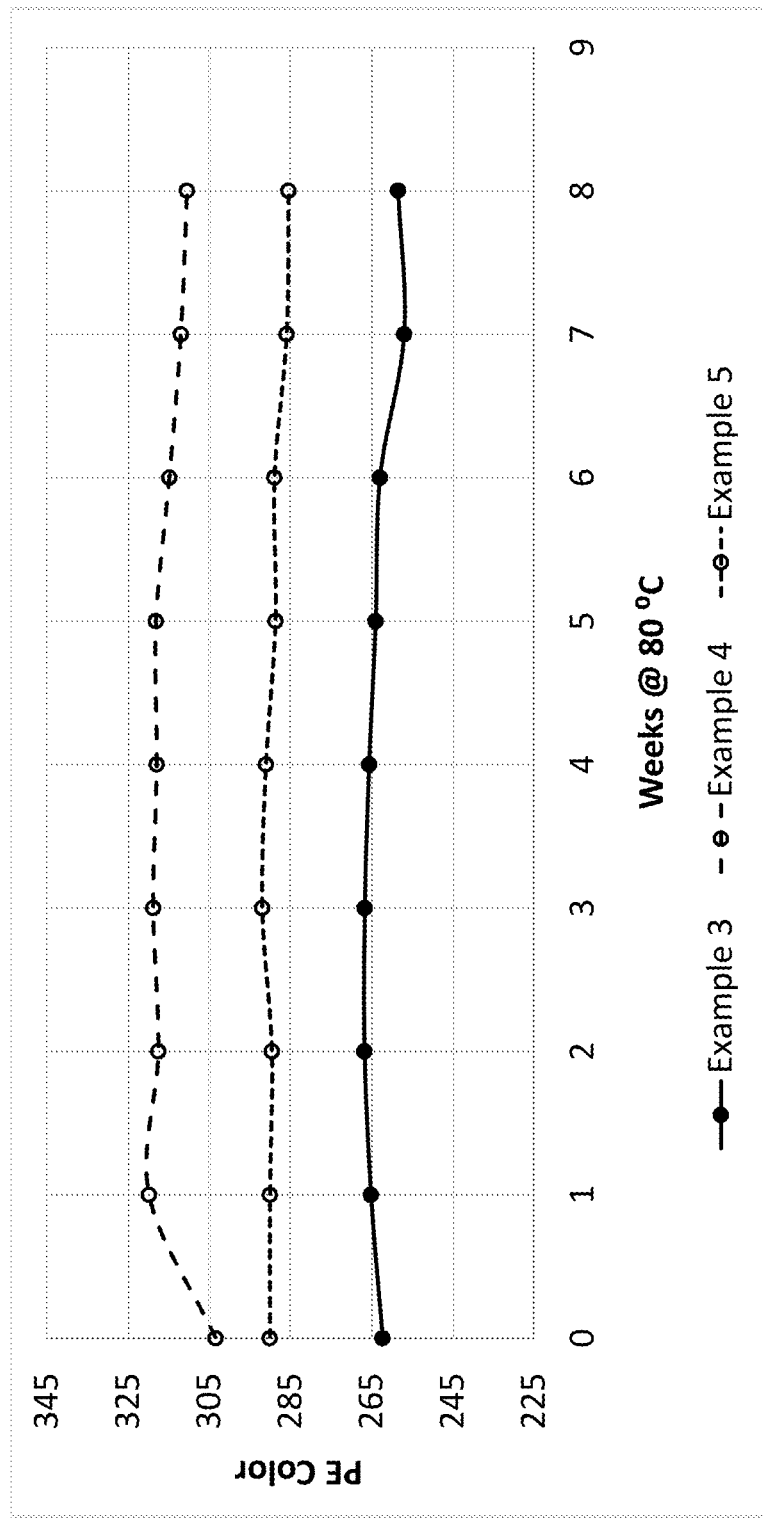
FIG. 5 presents a plot of the PE Color Number versus time at 80° C. for the pellets of the polymer compositions of Examples 3-5.

FIG. 4 presents a plot of the initial PE Color Number and multi-pass extrusion color after 1, 3, and 5 extrusion passes at 240° C. for the polymer compositions of Examples 3-5, and FIG. 5 presents a plot of the PE Color Number versus time at 80° C. for the pellets of the polymer compositions of Examples 3-5. Unexpectedly, the polymer composition of Example 5 (containing 300 ppm GMS) had superior initial color, aged color, and multi-pass extrusion color to that of Example 3.

Also unexpectedly, the polymer composition of Example 5 (containing 300 ppm of GMS) had generally comparable initial color and aged color to that of the polymer composition of Example 4 (containing 500 ppm of S9228T). The initial and aged color for Example 5 was less than that of Example 4, but generally within 20-40 PE color number units.

Examples 6-8

In Example 6, the polymer composition was produced with a Ziegler-Natta based polyethylene (8 MI, 0.962 g/cc), 125 ppm of DSTDP, 1000 ppm of calcium stearate, and 750 ppm of IRGAFOS™ 168; the polymer composition of Example 7 was produced with the Ziegler-Natta based polyethylene, 1000 ppm of calcium stearate, 700 ppm of IRGANOX™ 1010, 500 ppm of IRGAFOS™ 168, and 500 ppm of DOVERPHOS™ 59228 T; the polymer composition of Example 8 was produced with the Ziegler-Natta based polyethylene, 1000 ppm of calcium stearate, 700 ppm of IRGANOX™ 1010, 500 ppm of IRGAFOS™ 168, and 300 ppm of glycerol monostearate (GMS).

Figure 6:
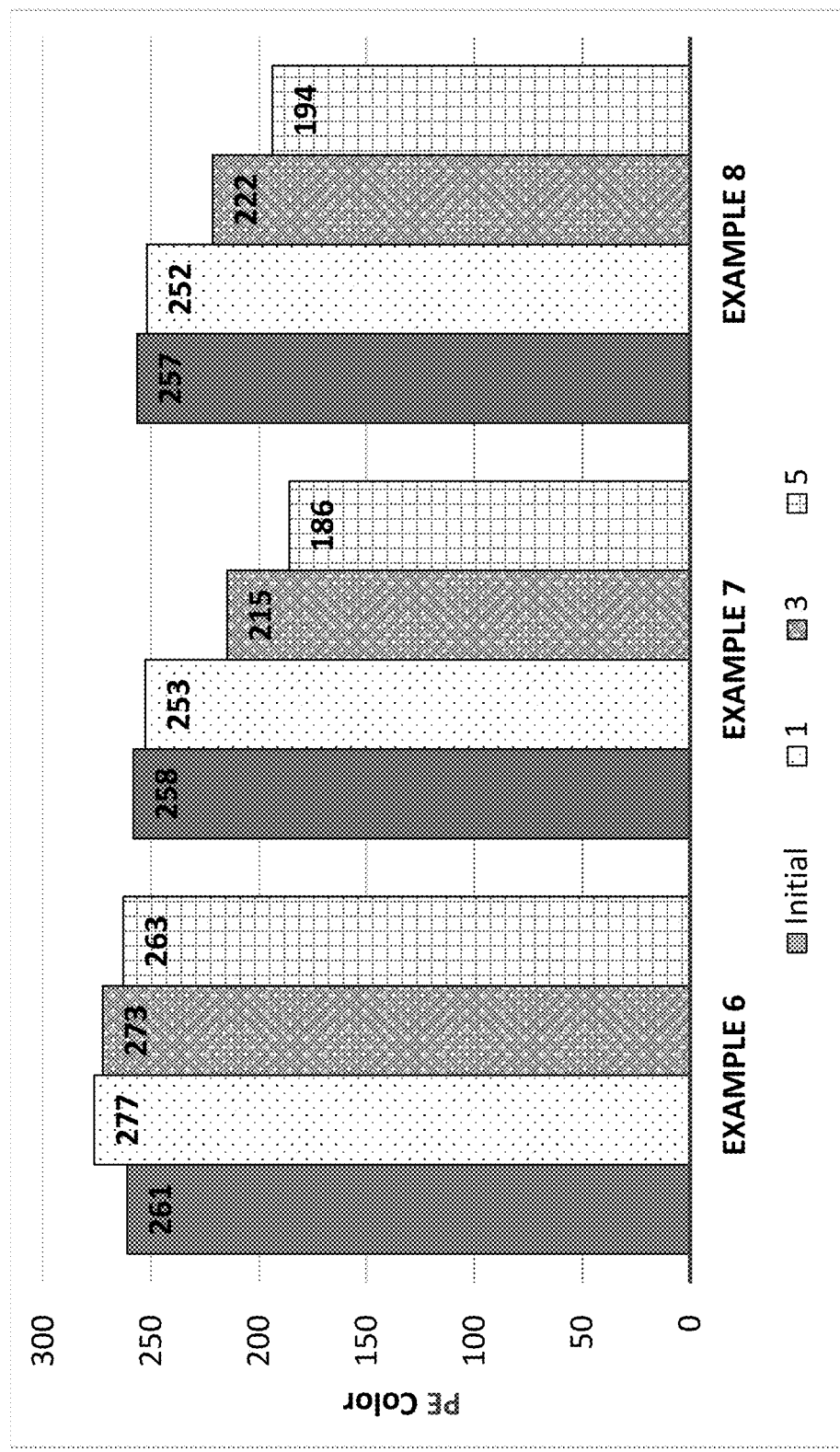
FIG. 6 presents a plot of the initial PE Color Number and multi-pass extrusion color after 1, 3, and 5 extrusion passes at 240° C. for the polymer compositions of Examples 6-8.
Figure 7:
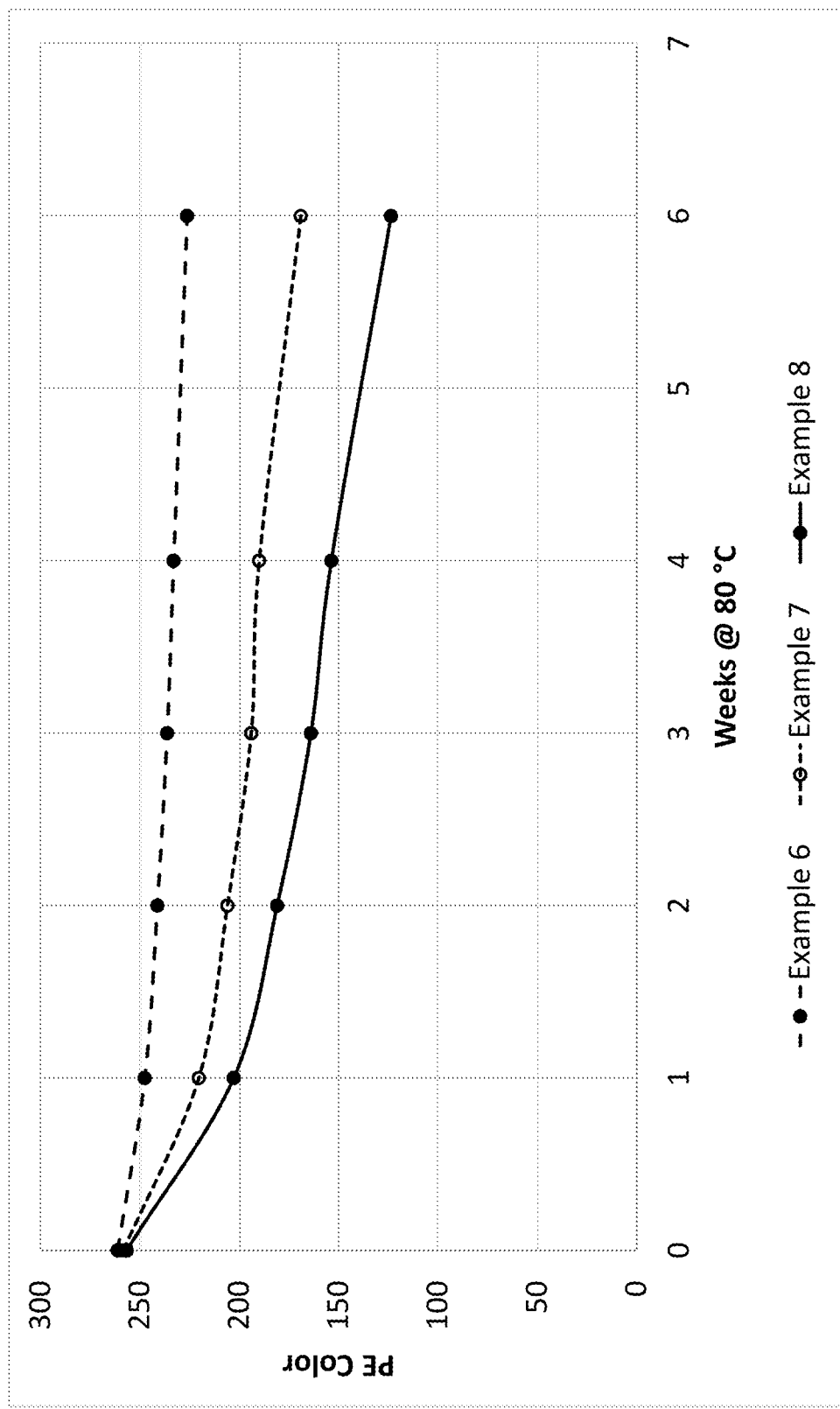
FIG. 7 presents a plot of the PE Color Number versus time at 80° C. for the pellets of the polymer compositions of Examples 6-8.

FIG. 6 presents a plot of the initial PE Color Number and multi-pass extrusion color after 1, 3, and 5 extrusion passes at 240° C. for the polymer compositions of Examples 6-8, and FIG. 7 presents a plot of the PE Color Number versus time at 80° C. for the pellets of the polymer compositions of Examples 6-8. Unexpectedly, the polymer composition of Example 8 (containing 300 ppm GMS) had the same initial color as that of Examples 6-7.

Also unexpectedly, the polymer composition of Example 8 (containing 300 ppm GMS) had superior multi-pass extrusion color to that of Example 7, and aged color that was less than that of Example 7, but generally within 50 PE color number units.

Examples 9-11

In Example 9, the polymer composition was produced with a metallocene-based polyethylene (1.4 MI, 0.916 g/cc), 200 ppm of calcium stearate, 1000 ppm of IRGANOX™ 1010, and 1500 ppm of IRGAFOS™ 168; the polymer composition of Example 10 was produced with the metallocene-based polyethylene, 700 ppm of IRGANOX™ 1010, 500 ppm of IRGAFOS™ 168, and 500 ppm of DOVERPHOS™ 59228T; the polymer composition of Example 11 was produced with the metallocene-based polyethylene, 700 ppm of IRGANOX™ 1010, 500 ppm of IRGAFOS™ 168, and 300 ppm of glycerol monostearate (GMS). These polymer compositions also contained a fluoroelastomer processing aid.

Figure 8:
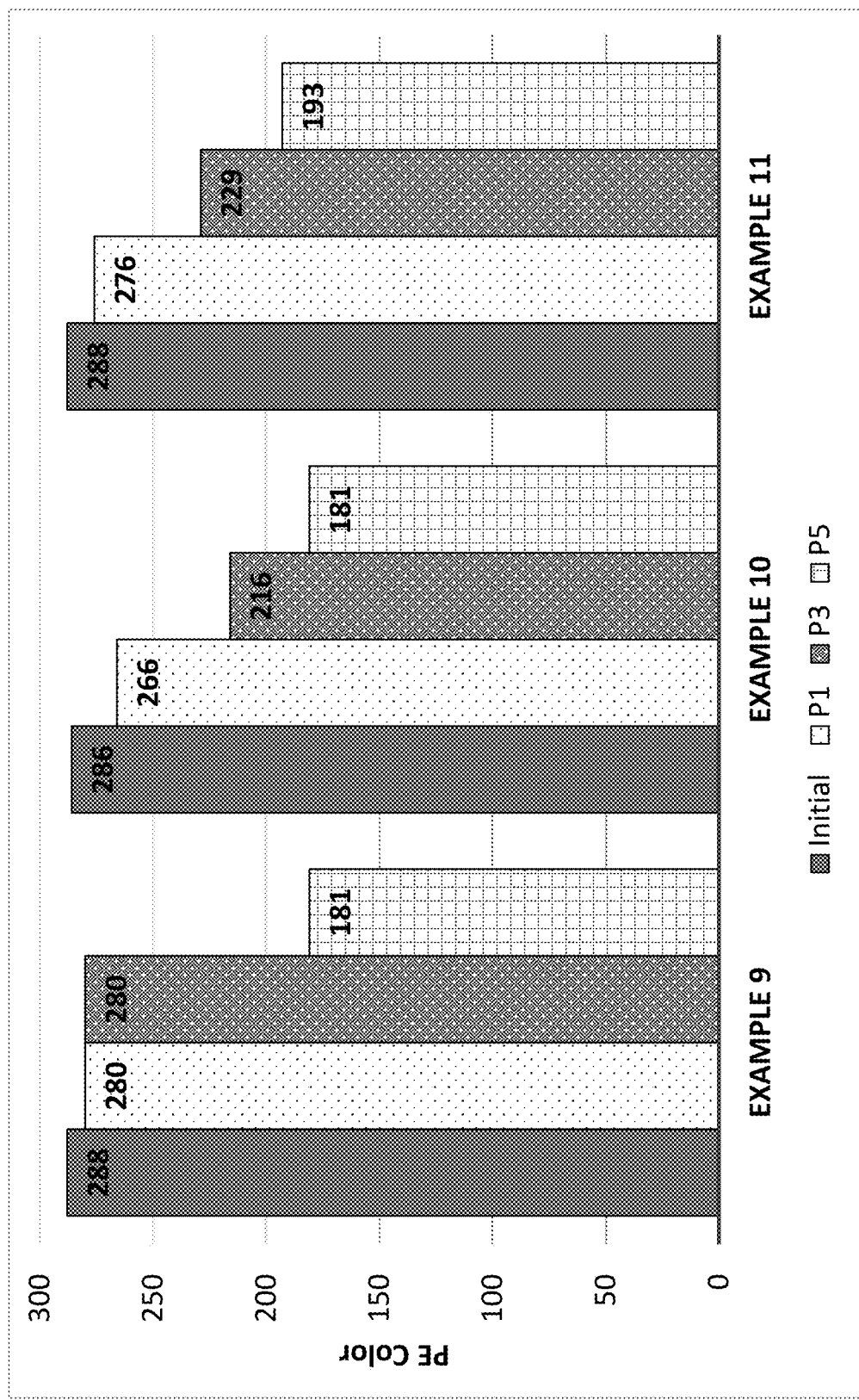
FIG. 8 presents a plot of the initial PE Color Number and multi-pass extrusion color after 1, 3, and 5 extrusion passes at 240° C. for the polymer compositions of Examples 9-11.
Figure 9:
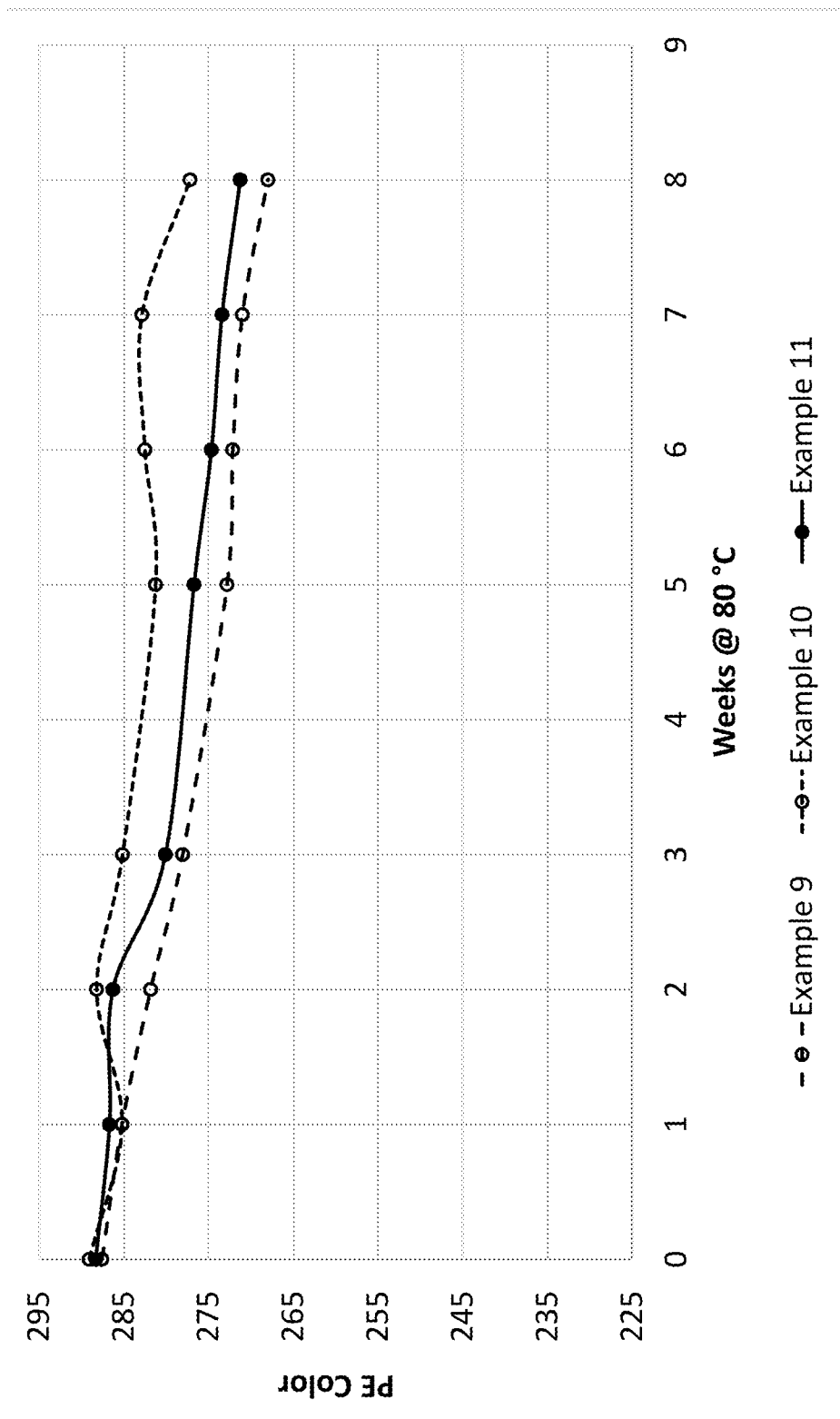
FIG. 9 presents a plot of the PE Color Number versus time at 80° C. for the pellets of the polymer compositions of Examples 9-11.

FIG. 8 presents a plot of the initial PE Color Number and multi-pass extrusion color after 1, 3, and 5 extrusion passes at 240° C. for the polymer compositions of Examples 9-11, and FIG. 9 presents a plot of the PE Color Number versus time at 80° C. for the pellets of the polymer compositions of Examples 9-11. Unexpectedly, the polymer composition of Example 11 (containing 300 ppm GMS) had the same initial color as that of Examples 9-10.

Also unexpectedly, the polymer composition of Example 11 (containing 300 ppm GMS) had superior multi-pass extrusion color to that of Example 10, and aged color that was less than that of Example 10, but generally within 10 PE color number units.

Examples 12-14

In Example 12, the polymer composition was produced with a Ziegler-Natta based polyethylene (8 MI, 0.962 g/cc), 125 ppm of DSTDP, 1000 ppm of calcium stearate, and 750 ppm of IRGAFOS™ 168; the polymer composition of Example 13 was produced with the Ziegler-Natta based polyethylene, 1000 ppm of calcium stearate, 750 ppm of IRGAFOS™ 168, and 300 ppm of glycerol monostearate (GMS); the polymer composition of Example 14 was produced with the Ziegler-Natta based polyethylene, 125 ppm of DSTDP, 1000 ppm of calcium stearate, 750 ppm of IRGAFOS™ 168, and 300 ppm of glycerol monostearate (GMS).

Figure 10:
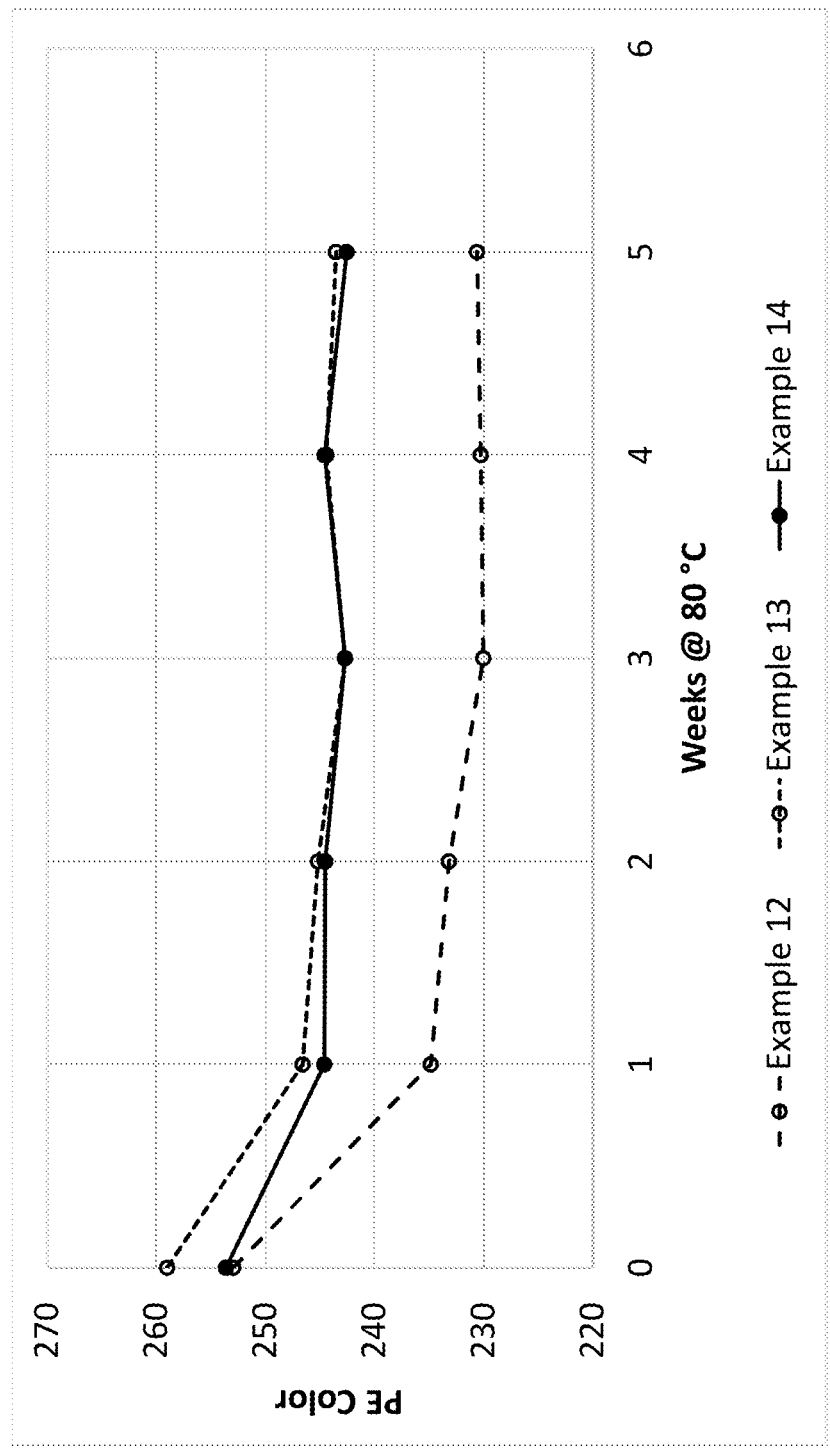
FIG. 10 presents a plot of the PE Color Number versus time at 80° C. for the pellets of the polymer compositions of Examples 12-14.
Figure 11:
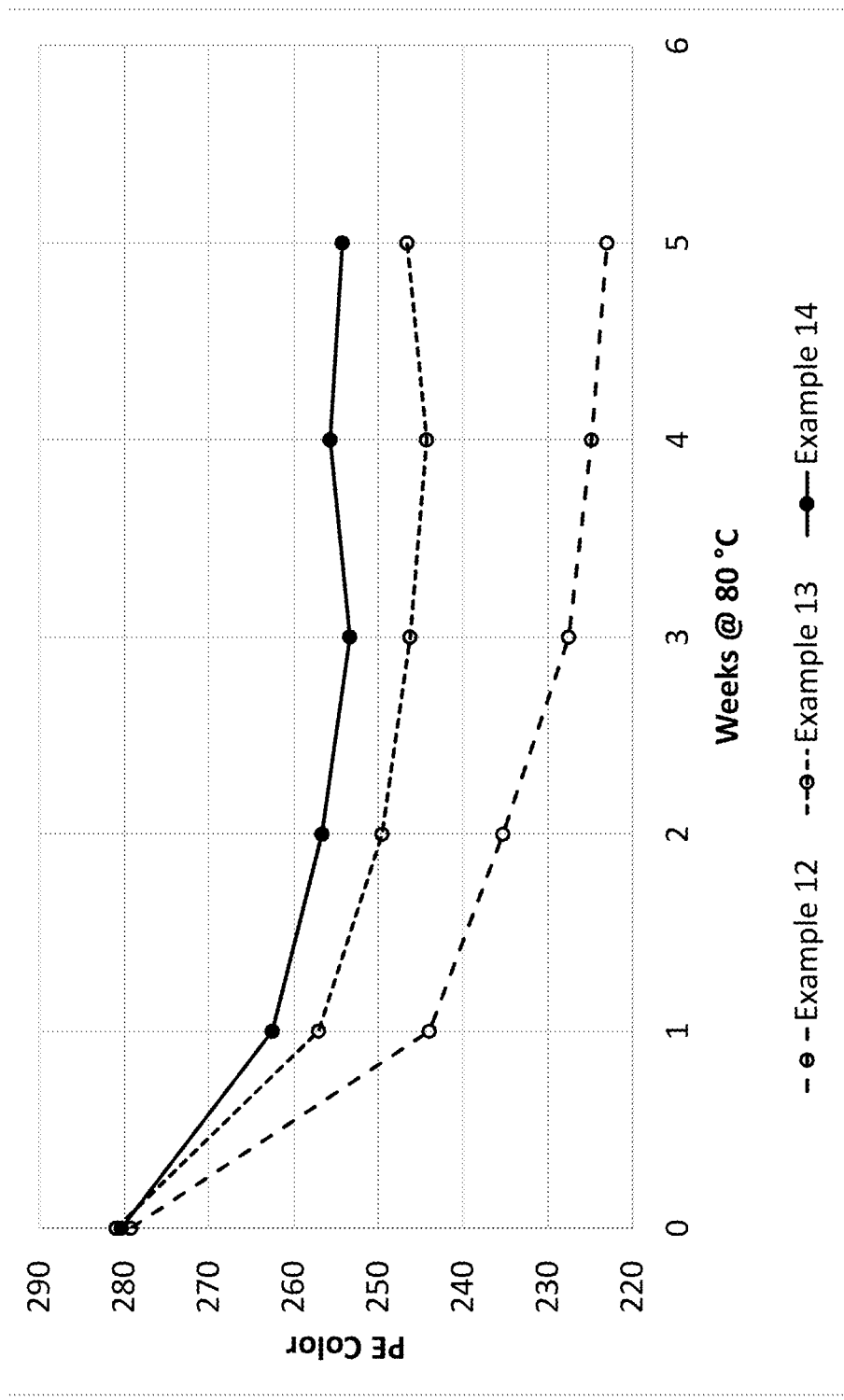
FIG. 11 presents a plot of the PE Color Number versus time at 80° C. for the 1st pass extrusion pellets of the polymer compositions of Examples 12-14.
Figure 12A:
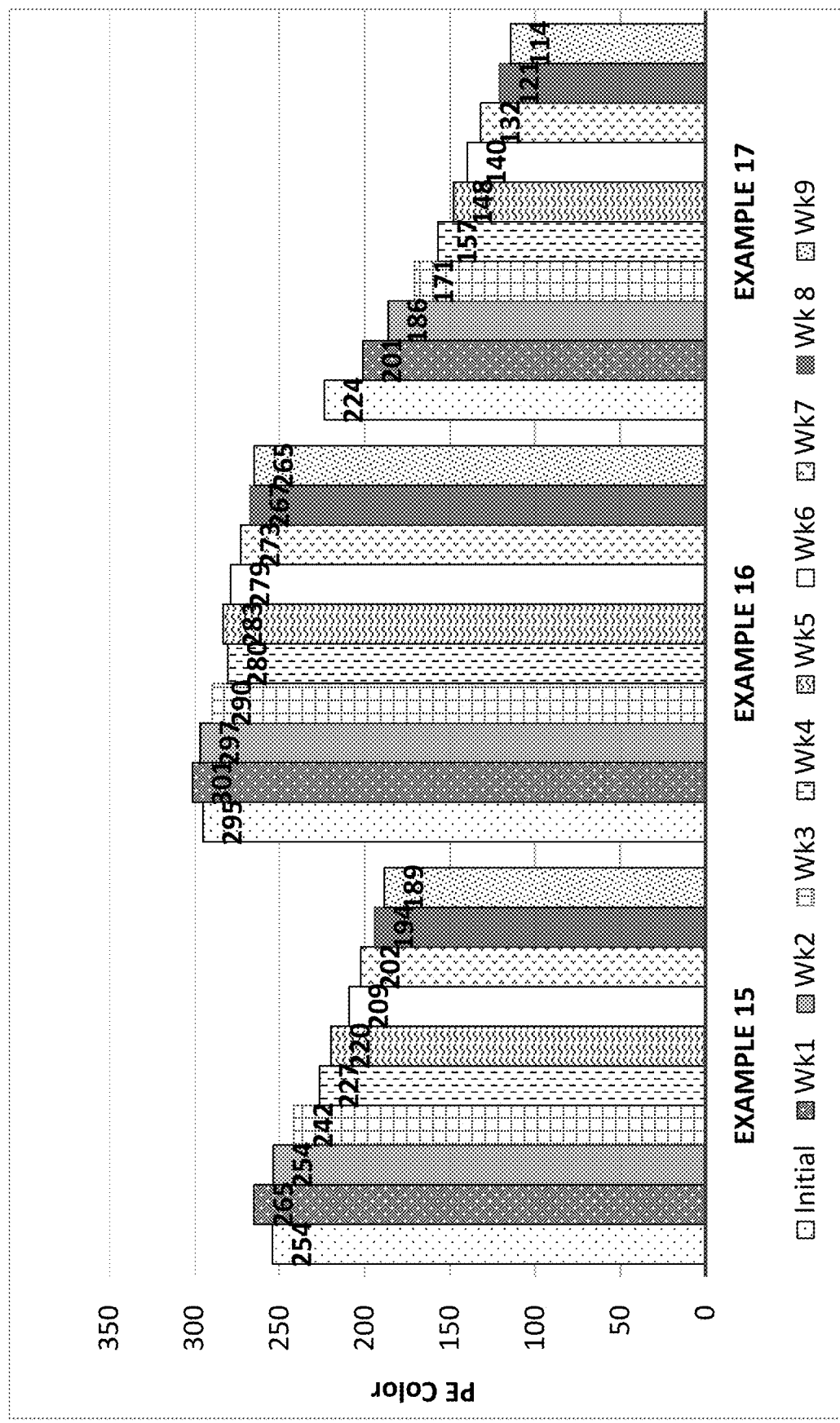
FIGS. 12A-12D present plots of the PE Color Number versus time at 80° C. for the pellets of the polymer compositions of Examples 15-25
Figure 12B:
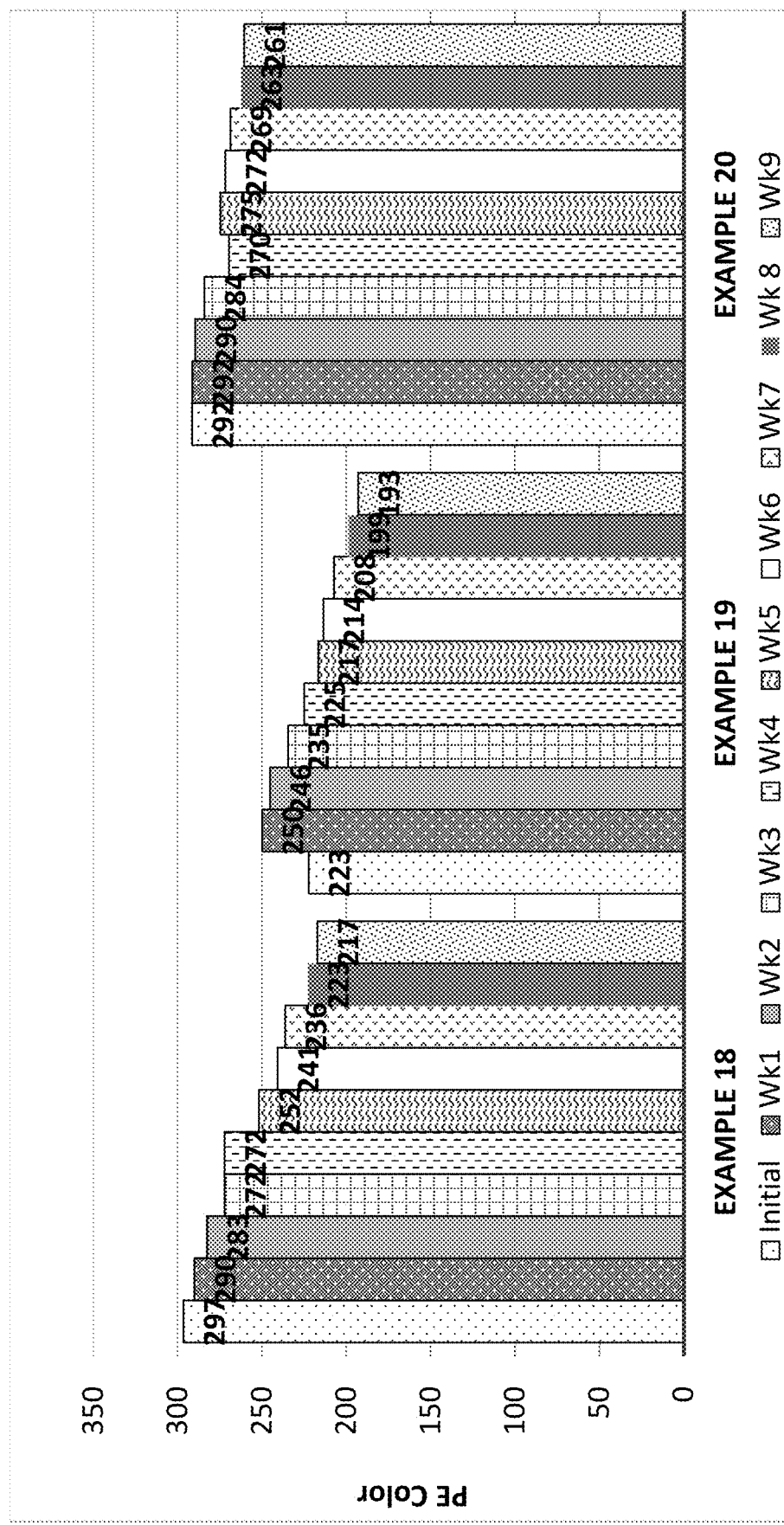
Figure 12C:
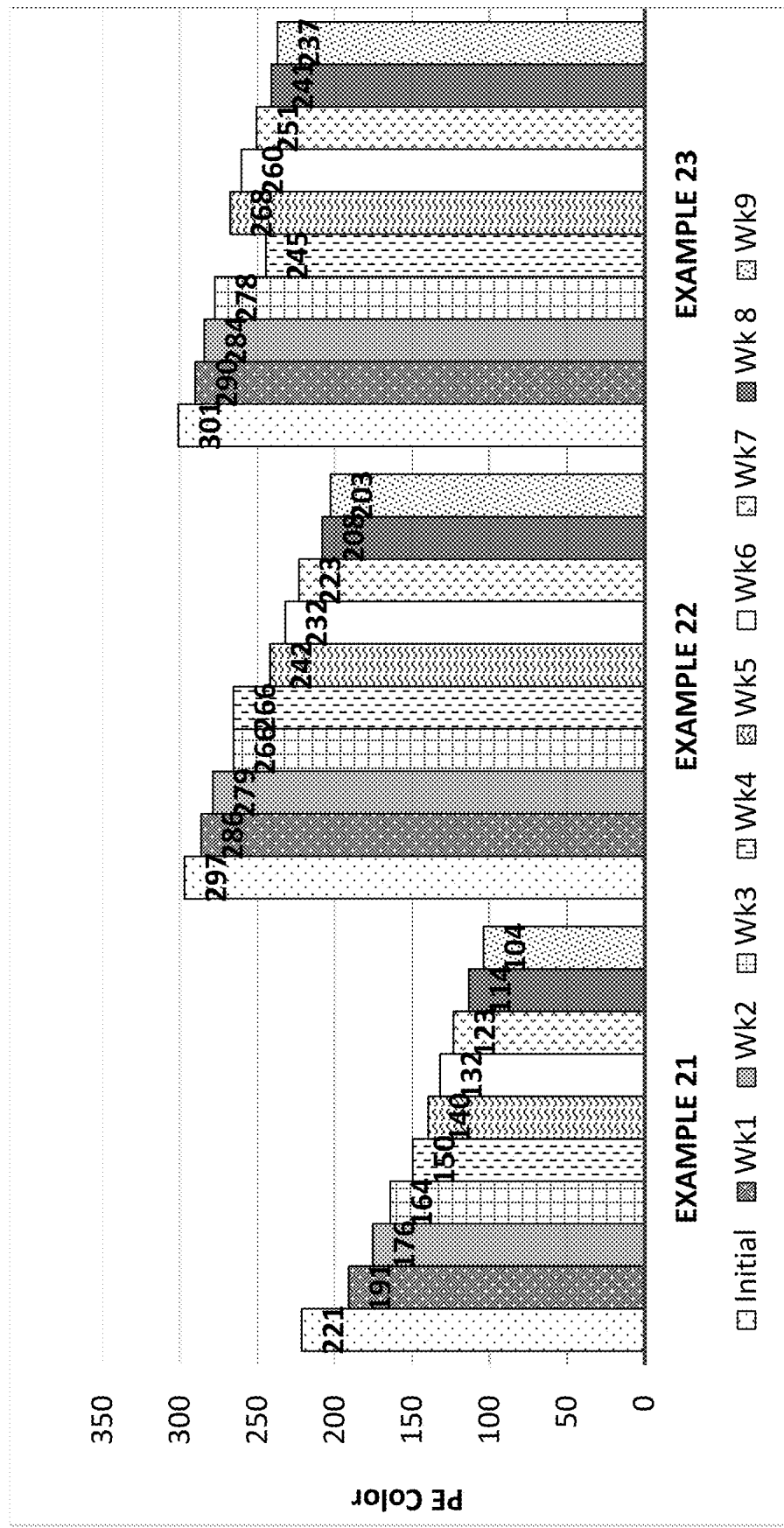
Figure 12D:
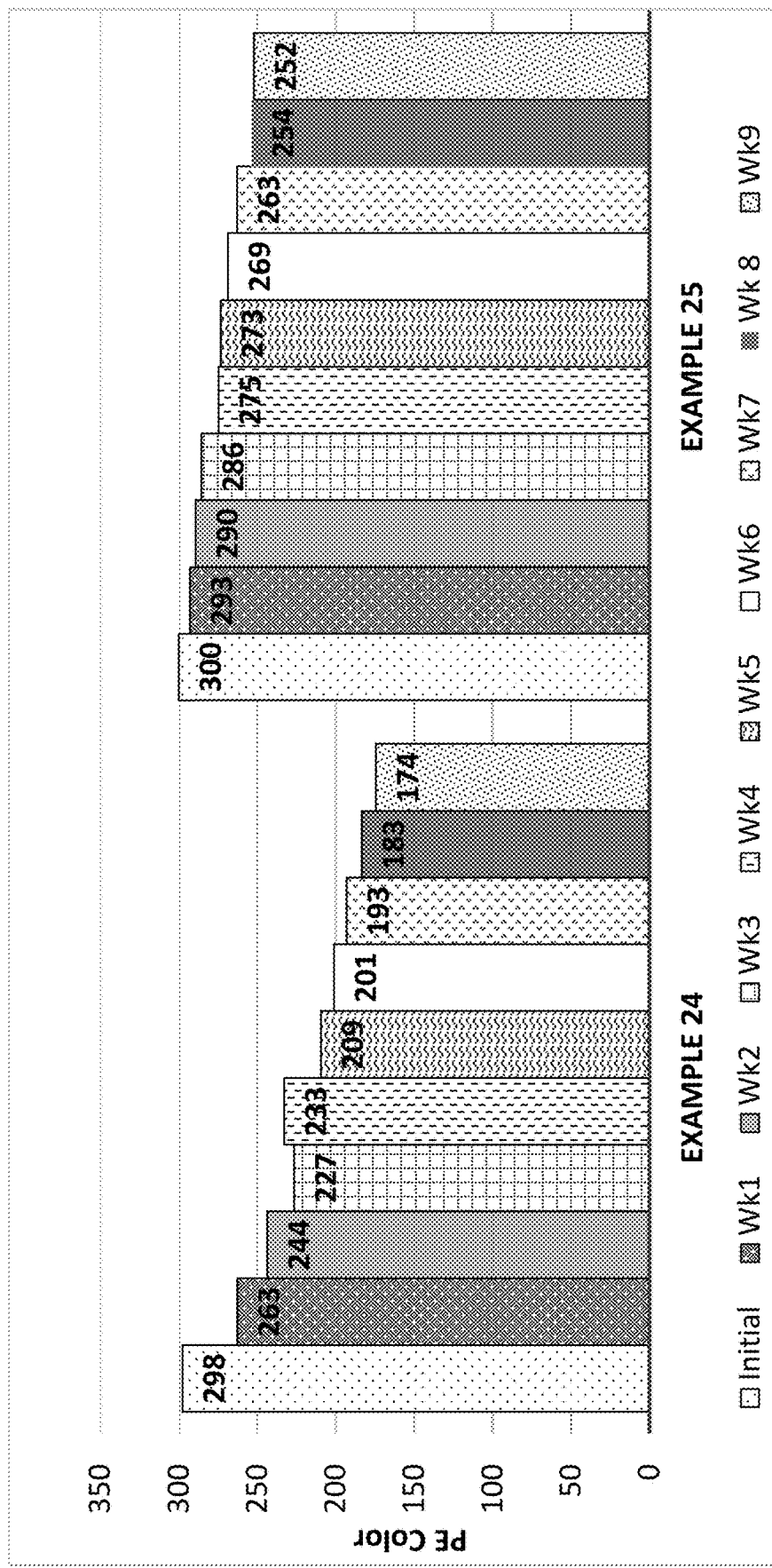

FIG. 10 illustrates the PE Color Number for the pellets of the polymer compositions of Examples 12-14 after aging at 80° C. for 5 weeks, and FIG. 11 illustrates the PE Color Number for the 1st pass extrusion pellets of the polymer compositions of Examples 12-14 after aging at 80° C. for 5 weeks. Unexpectedly, the polymer compositions of Examples 13-14 (which contained GMS) had superior aged color of the initial pellets for up to 5 weeks, and superior aged color of pellets subjected to 1 pass of extrusion processing for up to 5 weeks, as compared to Example 12 (which did not contain GMS).

Examples 15-25

In Example 15, the polymer composition was produced with a titanated chromium-based polyethylene (0.3 MI, 0.957 g/cc), 600 ppm by weight of IRGANOX™ 1076, 125 ppm by weight of IRGAFOS™ 168, and 125 ppm by weight of ULTRANOX™ 626; the polymer composition of Example 16 was produced with the titanated chromium-based polyethylene, 600 ppm of IRGANOX™ 1076, 125 ppm of IRGAFOS™ 168, 125 ppm of ULTRANOX™ 626, and 300 ppm of glycerol monostearate (GMS); the polymer composition of Example 17 was produced with the titanated chromium-based polyethylene, 600 ppm of IRGANOX™ 1076, and 125 ppm of IRGAFOS™ 168; the polymer composition of Example 18 was produced with the titanated chromium-based polyethylene, 600 ppm of IRGANOX™ 1076, 125 ppm of IRGAFOS™ 168, and 300 ppm of glycerol monostearate (GMS); the polymer composition of Example 19 was produced with the titanated chromium-based polyethylene, 600 ppm of IRGANOX™ 1076, and 125 ppm of ULTRANOX™ 627AV; the polymer composition of Example 20 was produced with the titanated chromium-based polyethylene, 600 ppm of IRGANOX™ 1076, 125 ppm of ULTRANOX™ 627AV, and 300 ppm of glycerol monostearate (GMS); the polymer composition of Example 21 was produced with the titanated chromium-based polyethylene and 600 ppm of IRGANOX™ 1076; the polymer composition of Example 22 was produced with the titanated chromium-based polyethylene, 600 ppm of IRGANOX™ 1076, and 300 ppm of glycerol monostearate (GMS); the polymer composition of Example 23 was produced with the titanated chromium-based polyethylene, 600 ppm of IRGANOX™ 1076, and 1000 ppm of Chemstat 182; the polymer composition of Example 24 was produced with the titanated chromium-based polyethylene, 600 ppm of IRGANOX™ 1076, and 1000 ppm of PEG 400; the polymer composition of Example 25 was produced with the titanated chromium-based polyethylene, 600 ppm of IRGANOX™ 1076, and 1000 ppm of glycerol monostearate (GMS).

Figure 13A:
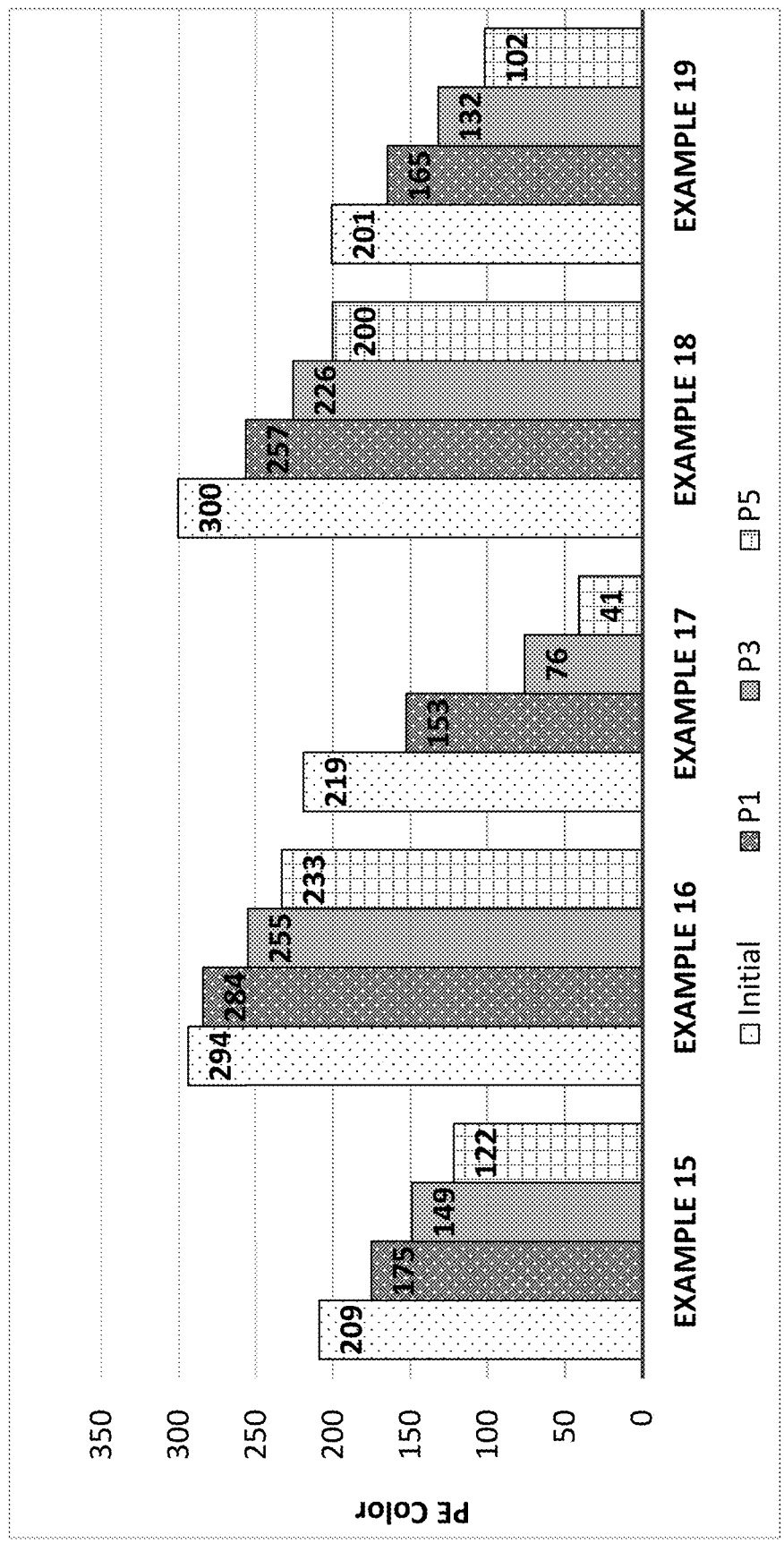
FIGS. 13A-13B present plots of the initial PE Color Number and multi-pass extrusion color after 1, 3, and 5 extrusion passes at 240° C. for the polymer compositions of Examples 15-25.
Figure 13B:
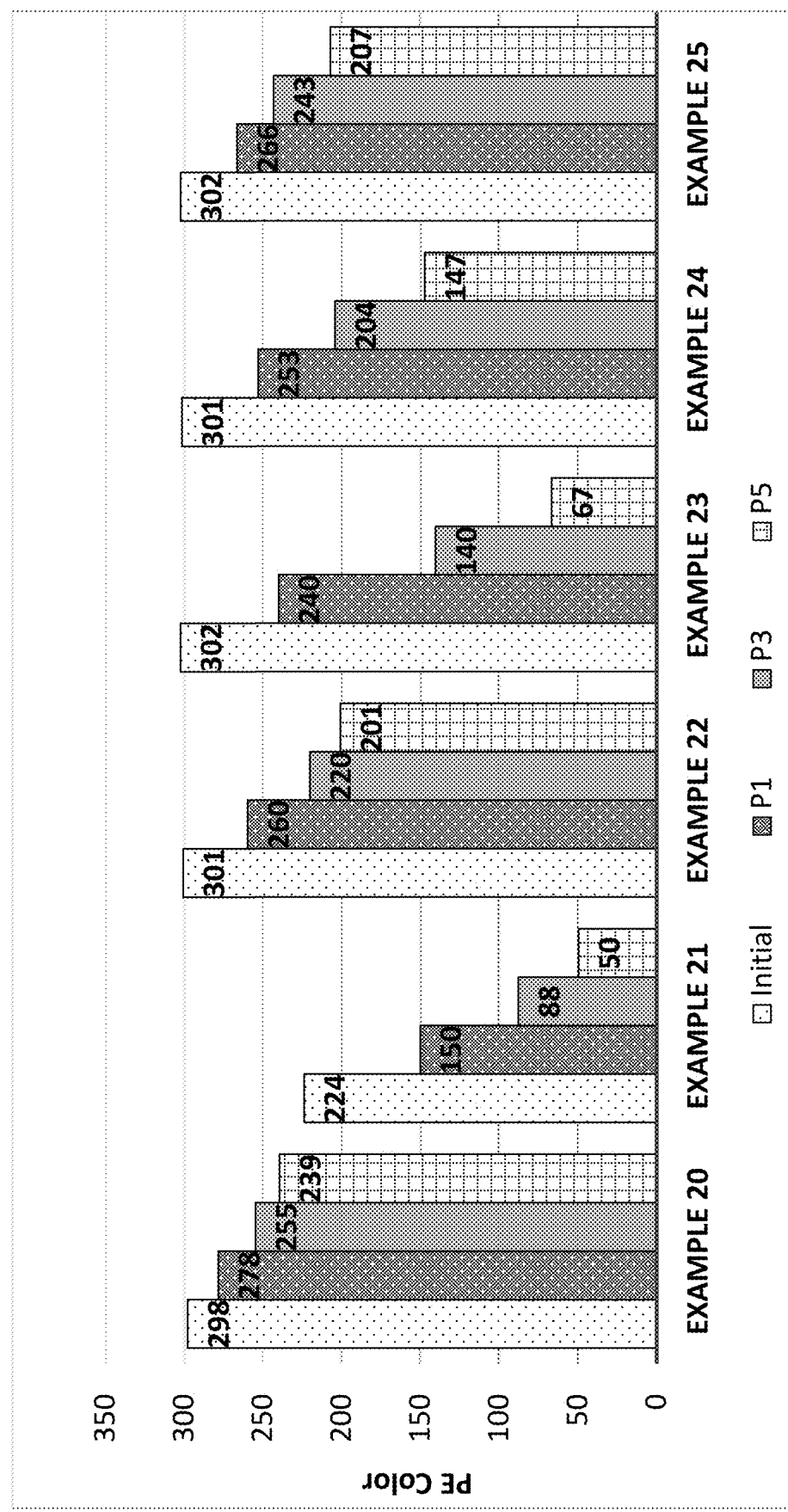

FIGS. 12A-12D present plots of the PE Color Number versus time at 80° C. for the pellets of the polymer compositions of Examples 15-25, and FIGS. 13A-13B present plots of the initial PE Color Number and multi-pass extrusion color after 1, 3, and 5 extrusion passes at 240° C. for the polymer compositions of Examples 15-25. These figures demonstrate unexpected improvements in initial color, aged color, and multi-pass extrusion color with the incorporation of GMS, whether in additive systems containing a phenolic antioxidant, or a phosphite antioxidant, or both. Increasing the amount of GMS also tended to increase the aged PE color number and the multi-pass extrusion PE color number. Further, the combination of GMS with a diphosphite led to a greater improvement in color than the diphosphite alone. The use of GMS gave superior multi-pass extrusion color to the use of conventional whitening agents (Chemstat 182, ethoxylated tallow amine; and Peg 400, polyethylene glycol) and comparable aged color.

Example 26

In Example 26, titanated chromium-based polyethylenes and chromium-based polyethylenes were analyzed via NMR to determine the respective amounts (per million total carbon atoms) of vinylene unsaturation, trisubstituted unsaturation, vinylidene unsaturation, vinyl unsaturation, and total unsaturation. The results are summarized in Table I. The titanated chromium resins had ratios of (vinylene+trisubstituted+vinylidene groups)/vinyl groups in the 0.21-0.41 range, whereas the ratios were in the 0.06-0.11 range for the chromium resins. Similarly, the titanated chromium resins had ratios of (vinylene+trisubstituted+vinylidene groups)/total unsaturated groups in the 0.18-0.29 range, whereas the ratios were in the 0.05-0.10 range for the chromium resins.

TABLE I

NMR summary.

| MI or HLMI (g/10 min) | Density (g/cc) | Form | Catalyst | Vinylene | Trisub | Vinylidene | Vinyl | (vinylene + trisub + vinylidene)/ vinyl | Total Unsaturated Groups | (vinylene + trisub + vinylidene)/ total |
|---|---|---|---|---|---|---|---|---|---|---|
| MI = 0.18 | 0.946 | Pellet | Ti Cr | 66 | 32 | 0 | 364 | 0.27 | 462 | 0.21 |
| MI = 0.20 | 0.938 | Pellet | Ti Cr | 67 | 8 | 55 | 611 | 0.21 | 741 | 0.18 |
| HLMI = 21 | 0.937 | Pellet | Ti Cr | 129 | 145 | 2 | 676 | 0.41 | 952 | 0.29 |
| MI = 0.35 | 0.955 | Pellet | Cr | 7 | 13 | 5 | 432 | 0.06 | 457 | 0.05 |
| HLMI = 10 | 0.948 | Fluff | Cr | 57 | 34 | 5 | 861 | 0.11 | 957 | 0.10 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A polymer composition comprising:
(i) an ethylene polymer;
(ii) from about 50 ppm to about 1500 ppm of a glycerol stearate; and
(iii) from about 250 ppm to about 7500 ppm of an antioxidant comprising a phenolic antioxidant, a phosphite antioxidant, a thioester antioxidant, or any combination thereof.

Aspect 2. A method for improving the color (e.g., initial color, aged color, or multi-pass extrusion color) of a polymer composition, the method comprising:
combining (i) an ethylene polymer with an additive system comprising a glycerol stearate and an antioxidant to form the polymer composition, wherein the polymer composition comprises:
(ii) from about 50 ppm to about 1500 ppm of a glycerol stearate; and
(iii) from about 250 ppm to about 7500 ppm of an antioxidant comprising a phenolic antioxidant, a phosphite antioxidant, a thioester antioxidant, or any combination thereof.

Aspect 3. A process for producing a polymer composition with improved color (e.g., initial color, aged color, or multi-pass extrusion color), the process comprising:
(a) contacting a transition metal-based catalyst system with ethylene and an optional olefin comonomer under polymerization conditions in a polymerization reactor system to produce (i) an ethylene polymer; and
(b) combining the ethylene polymer with an additive system comprising a glycerol stearate and an antioxidant to form the polymer composition, wherein the polymer composition comprises:
(ii) from about 50 ppm to about 1500 ppm of a glycerol stearate; and
(iii) from about 250 ppm to about 7500 ppm of an antioxidant comprising a phenolic antioxidant, a phosphite antioxidant, a thioester antioxidant or any combination thereof.

Aspect 4. The composition, method, or process defined in any one of aspects 1-3, wherein the polymer composition contains an amount of the glycerol stearate in any range disclosed herein, e.g., from about 100 ppm to about 1250 ppm, from about 150 ppm to about 1000 ppm, from about 100 ppm to about 850 ppm, from about 200 ppm to about 500 ppm, etc.

Aspect 5. The composition, method, or process defined in any one of aspects 1-4, wherein the polymer composition contains glycerol monostearate.

Aspect 6. The composition, method, or process defined in any one of aspects 1-4, wherein the polymer composition contains glycerol distearate.

Aspect 7. The composition, method, or process defined in any one of aspects 1-4, wherein the polymer composition contains glycerol monostearate and glycerol distearate.

Aspect 8. The composition, method, or process defined in any one of aspects 1-7, wherein the polymer composition contains an amount of the antioxidant in any range disclosed herein, e.g., from about 500 ppm to about 5000 ppm, from about 500 ppm to about 3500 ppm, from about 750 ppm to about 5000 ppm, from about 750 ppm to about 2500 ppm, etc.

Aspect 9. The composition, method, or process defined in any one of aspects 1-8, wherein the polymer composition contains an amount of the phenolic antioxidant in any range disclosed herein, e.g., from about 200 ppm to about 2500 ppm, from about 500 ppm to about 1000 ppm, etc.

Aspect 10. The composition, method, or process defined in any one of aspects 1-9, wherein the phenolic antioxidant comprises any suitable phenolic antioxidant, e.g., IRGANOX™ 1010, IRGANOX™ 1076, IRGANOX™ 1330, IRGANOX™ 3114, IRGANOX™ 129, IRGANOX™ MD 1024, etc., as well as combinations thereof.

Aspect 11. The composition, method, or process defined in any one of aspects 1-10, wherein the polymer composition contains an amount of the phosphite antioxidant in any range disclosed herein, e.g., from about 500 ppm to about 5000 ppm, from about 750 ppm to about 3500 ppm, etc.

Aspect 12. The composition, method, or process defined in any one of aspects 1-11, wherein the phosphite antioxidant comprises a monophosphite antioxidant, a diphosphite antioxidant, a polyphosphite antioxidant, or any combination thereof.

Aspect 13. The composition, method, or process defined in any one of aspects 1-12, wherein the phosphite antioxidant comprises any suitable monophosphite antioxidant, e.g., IRGAFOS™ 168, HP-10, etc., as well as combinations thereof.

Aspect 14. The composition, method, or process defined in any one of aspects 1-13, wherein the phosphite antioxidant comprises any suitable diphosphite antioxidant, e.g., ULTRANOX™ 627A, ULTRANOX™ 626, PEP-36, DOVERPHOS™ 9228, etc., as well as combinations thereof.

Aspect 15. The composition, method, or process defined in any one of aspects 1-14, wherein the phosphite antioxidant comprises a monophosphite antioxidant and a diphosphite antioxidant at a weight ratio of the monophosphite antioxidant to the diphosphite antioxidant (monophosphite:diphosphite) in any range disclosed herein, e.g., from about 10:1 to about 1:10, from about 2:1 to about 1:2, from about 1.2:1 to about 1:1.2, etc.

Aspect 16. The composition, method, or process defined in any one of aspects 1-14, wherein the phosphite antioxidant comprises any suitable polyphosphite antioxidant, e.g., LGP 11, Weston 705, etc., as well as combinations thereof.

Aspect 17. The composition, method, or process defined in any one of aspects 1-16, wherein the polymer composition contains an amount of the thioester antioxidant in any range disclosed herein, e.g., from about 20 ppm to about 1500 ppm, from about 40 to about 500 ppm, from about 50 ppm to about 250 ppm, etc.

Aspect 18. The composition, method, or process defined in any one of aspects 1-17, wherein the thioester antioxidant comprises any suitable thioester antioxidant, e.g., DSTDP (distearyl thiodipropionate), DLTDP (dilauryl thiodipropionate), etc., as well as combinations thereof.

Aspect 19. The composition, method, or process defined in any one of aspects 1-18, wherein the polymer composition comprises a phenolic antioxidant and a phosphite antioxidant.

Aspect 20. The composition, method, or process defined in any one of aspects 1-18, wherein the polymer composition comprises a phenolic antioxidant and a monophosphite antioxidant.

Aspect 21. The composition, method, or process defined in any one of aspects 1-18, wherein the polymer composition comprises a thioester antioxidant and a phosphite antioxidant.

Aspect 22. The composition, method, or process defined in any one of aspects 1-18, wherein the polymer composition comprises a thioester antioxidant and a monophosphite antioxidant.

Aspect 23. The composition, method, or process defined in any one of aspects 1-22, wherein the ethylene polymer has a Mw in any range disclosed herein, e.g., from about 100,000 to about 750,000 g/mol, from about 100,000 to about 300,000 g/mol, from about 150,000 to about 750,000 g/mol, from about 175,000 to about 500,000 g/mol, from about 250,000 to about 750,000 g/mol, etc.

Aspect 24. The composition, method, or process defined in any one of aspects 1-23, wherein the ethylene polymer has a ratio of Mw/Mn in any range disclosed herein, e.g., from about 2 to about 40, from about 2 to about 5, from about 5 to about 40, from about 7 to about 35, from about 15 to about 40, etc.

Aspect 25. The composition, method, or process defined in any one of aspects 1-24, wherein the ethylene polymer has a melt index (MI) in any range disclosed herein, e.g., from 0 to about 10, from 0 to about 5, from 0 to about 1 g/10 min, from 0 to about 0.5 g/10 min, from 0 to about 0.3 g/10 min, etc.

Aspect 26. The composition, method, or process defined in any one of aspects 1-25, wherein the ethylene polymer has a high load melt index (HLMI) in any range disclosed herein, e.g., from about 0.5 to about 100 g/10 min, from about 0.5 to about 25 g/10 min, from about 0.5 to about 10 g/10 min, from about 1 to about 50 g/10 min, from about 1 to about 15 g/10 min, etc.

Aspect 27. The composition, method, or process defined in any one of aspects 1-26, wherein the ethylene polymer has a density in any range disclosed herein, e.g., from about 0.88 to about 0.97 $g/cm^3$, from about 0.91 to about 0.93 $g/cm^3$, from about 0.92 to about 0.96 $g/cm^3$, from about 0.93 to about 0.96 $g/cm^3$, from about 0.935 to about 0.955 $g/cm^3$, etc.

Aspect 28. The composition, method, or process defined in any one of aspects 1-27, wherein the ethylene polymer has a unimodal molecular weight distribution.

Aspect 29. The composition, method, or process defined in any one of aspects 1-28, wherein the ethylene polymer is characterized by a ratio of (vinylene+trisubstituted+vinylidene groups)/vinyl groups in any range disclosed herein, e.g., from about 0.15 to about 0.7, from about 0.15 to about 0.5, from about 0.18 to about 0.6, etc.

Aspect 30. The composition, method, or process defined in any one of aspects 1-29, wherein the ethylene polymer is characterized by a ratio of (vinylene+trisubstituted+vinylidene groups)/total unsaturated groups in any range disclosed herein, e.g., from about 0.12 to about 0.5, from about 0.12 to about 0.35, from about 0.14 to about 0.4, etc.

Aspect 31. The composition, method, or process defined in any one of aspects 1-30, wherein the ethylene polymer is a single reactor product, e.g., not a post-reactor blend of two polymers, for instance, having different molecular weight characteristics.

Aspect 32. The composition, method, or process defined in any one of aspects 1-31, wherein the ethylene polymer comprises an ethylene homopolymer and/or an ethylene/α-olefin copolymer.

Aspect 33. The composition, method, or process defined in any one of aspects 1-32, wherein the ethylene polymer comprises an ethylene homopolymer, an ethylene/1-butene copolymer, an ethylene/1-hexene copolymer, and/or an ethylene/1-octene copolymer.

Aspect 34. The composition, method, or process defined in any one of aspects 1-33, wherein the ethylene polymer contains an amount (in ppm by weight) of zirconium (or hafnium, or titanium, or chromium, independently), in any range disclosed herein, e.g., less than 0.2 ppm, less than 0.1 ppm, less than 0.08 ppm, less than 0.05 ppm, or no measurable amount (below the level of detection), of zirconium (or hafnium, or titanium, or chromium, independently).

Aspect 35. The composition, method, or process defined in any one of aspects 1-34, wherein the ethylene polymer contains an amount (in ppm by weight) of magnesium in any range disclosed herein, e.g., less than 5 ppm, less than 1 ppm, less than 0.5 ppm, less than 0.1 ppm, or no measurable amount (below the level of detection), of magnesium.

Aspect 36. The composition, method, or process defined in any one of aspects 1-33, wherein the ethylene polymer contains an amount (in ppm by weight) of zirconium (or hafnium, or titanium, or chromium, independently) in any range in any range disclosed herein, e.g., from about 0.5 ppm to about 15 ppm, from about 0.5 ppm to about 10 ppm, from about 1 ppm to about 15 ppm, or from about 1 ppm to about 10 ppm, of zirconium (or hafnium, or titanium, or chromium, independently).

Aspect 37. The composition, method, or process defined in any one of aspects 1-33, wherein the ethylene polymer is a metallocene-based ethylene polymer (produced using a metallocene catalyst system, or the transition metal-based catalyst system comprises a metallocene compound).

Aspect 38. The composition, method, or process defined in any one of aspects 1-33, wherein the ethylene polymer is a Ziegler-Natta based ethylene polymer (produced using a Ziegler-Natta catalyst, or the transition metal-based catalyst system comprises a Ziegler-Natta catalyst).

Aspect 39. The composition, method, or process defined in any one of aspects 1-33, wherein the ethylene polymer is a chromium-based ethylene polymer (produced using a chromium catalyst, or the transition metal-based catalyst system comprises a chromium catalyst).

Aspect 40. The composition, method, or process defined in any one of aspects 1-33, wherein the ethylene polymer is a titanated chromium-based ethylene polymer (produced using a titanated chromium catalyst, or the transition metal-based catalyst system comprises a titanated chromium catalyst).

Aspect 41. The composition, method, or process defined in any one of aspects 1-40, wherein the polymer composition is in the form of pellets.

Aspect 42. The composition, method, or process defined in any one of aspects 1-41, wherein the polymer composition further comprises at least one other additive selected from an antiblock additive, a slip additive, a colorant, a filler, a UV additive, an anti-stat additive, a processing aid, an acid scavenger, a carbon centered radical scavenger, etc., or any combination thereof.

Aspect 43. The composition, method, or process defined in any one of aspects 1-42, wherein the polymer composition has an initial PE color number of at least 200, at least 250, at least 275, at least 290, etc.

Aspect 44. The composition, method, or process defined in any one of aspects 1-43, wherein the polymer composition has an initial PE color number that is greater than that or within 20 of a comparable (otherwise equivalent) polymer composition that contains 200-700 ppm of a diphosphite antioxidant instead of the glycerol stearate.

Aspect 45. The composition, method, or process defined in any one of aspects 1-44, wherein the polymer composition has an aged PE color number of at least 200, at least 220, at least 240, at least 260, at least 280, etc., after storage (in air) for 3 weeks (or 4 weeks, or 6 weeks, or 8 weeks) at a temperature of 80° C.

Aspect 46. The composition, method, or process defined in any one of aspects 1-45, wherein the polymer composition has an aged PE color number that is greater than that or within 20 of a comparable (otherwise equivalent) polymer composition that contains 200-700 ppm of a diphosphite antioxidant instead of the glycerol stearate.

Aspect 47. The composition, method, or process defined in any one of aspects 1-46, wherein the polymer composition has a multi-pass extrusion PE color number of at least 180, at least 200, at least 220, at least 240, at least 260, etc., after one extrusion pass (or 3 extrusion passes, or 5 extrusion passes) at a temperature of 240° C.

Aspect 48. The composition, method, or process defined in any one of aspects 1-47, wherein the polymer composition has a multi-pass extrusion PE color number that is greater than that or within 20 of a comparable (otherwise equivalent) polymer composition that contains 200-700 ppm of a diphosphite antioxidant instead of the glycerol stearate.

Aspect 49. An article produced from the polymer composition defined in any one of aspects 1-48.

Aspect 50. The article of aspect 49, wherein the article is a film, pipe, or blow molded article.

Aspect 51. The method or process defined in any one of aspects 2-48, wherein the step of combining comprises blending and/or melt processing (e.g., extrusion).

Aspect 52. The process defined in any one of aspects 3-48, wherein the reactor system comprises one reactor.

Aspect 53. The process defined in any one of aspects 3-48, wherein the reactor system comprises two or more reactors.

Aspect 54. The process defined in any one of aspects 3-48 and 51-53, wherein the reactor system comprises a solution reactor, gas-phase reactor, slurry reactor, or a combination thereof.

Aspect 55. The process defined in any one of aspects 3-48 and 51-54, wherein the reactor system comprises a loop slurry reactor.

Aspect 56. The process defined in any one of aspects 3-48 and 51-55, wherein the polymerization conditions comprise a polymerization reaction temperature in a range from about 60° C. to about 185° C., from about 60° C. to about 115° C., or from about 130° C. to about 180° C., and any suitable reaction pressure, e.g., from about 200 to about 1000 psig.

Aspect 57. The process defined in any one of aspects 3-48 and 51-56, wherein the catalyst system comprises a co-catalyst.

Aspect 58. The process defined in any one of aspects 3-48 and 51-57, wherein the catalyst system is a metallocene-based catalyst system, a Ziegler-Natta based catalyst system, a chromium-based catalyst system, a titanated chromium-based catalyst system, or a combination thereof.

Aspect 59. The process defined in any one of aspects 3-48 and 51-58, wherein the olefin comonomer comprises 1-butene, 1-hexene, 1-octene, or a mixture thereof.

Aspect 60. The process defined in any one of aspects 3-48 and 51-59, wherein the ethylene polymer comprises an ethylene homopolymer, an ethylene/1-butene copolymer, an ethylene/1-hexene copolymer, and/or an ethylene/1-octene copolymer.

Aspect 61. The process defined in any one of aspects 3-48 and 51-60, wherein the ethylene polymer comprises a linear low density polyethylene (LLDPE) and/or a high density polyethylene (HDPE).

Aspect 62. A masterbatch composition comprising:
(1) a carrier resin; and
(2) an additive mixture comprising a glycerol stearate and an antioxidant comprising a phenolic antioxidant, a phosphite antioxidant, a thioester antioxidant, or any combination thereof, at a weight ratio of glycerol stearate:antioxidant in a range from about 6:1 to about 1:150;
wherein a weight ratio of the carrier resin:additive mixture is in a range from about 95:5 to about 20:80.

Aspect 63. The composition defined in aspect 62, wherein the carrier resin comprises an ethylene polymer (e.g., any ethylene polymer disclosed herein), a propylene polymer, or any combination thereof.

Aspect 64. The composition defined in aspect 62 or 63, wherein the masterbatch composition is in the form of pellets.

Aspect 65. An additive blend composition comprising:
(1) at least about 95 wt. % of an additive mixture comprising a glycerol stearate and an antioxidant comprising a phenolic antioxidant, a phosphite antioxidant, a thioester antioxidant, or any combination thereof, at a weight ratio of glycerol stearate:antioxidant in a range from about 6:1 to about 1:150; and
(2) less than or equal to about 3 wt. % of an ethylene polymer, a propylene polymer, or any combination thereof.

Aspect 66. The composition defined in aspect 65, wherein the composition contains less than or equal to about 2 wt. %, less than or equal to about 1 wt. %, less than or equal to about 0.5 wt. %, etc., of the ethylene polymer, propylene polymer, or combination thereof.

Aspect 67. The composition defined in aspect 65 or 66, wherein the composition contains at least about 97 wt. %, at least about 98 wt. %, at least about 99 wt. %, etc., of the additive mixture.

Aspect 68. The composition defined in any one of aspects 65-67, wherein the composition is in the form of powder, pellets, or beads.

Aspect 69. The composition defined in any one of aspects 65-68, wherein the composition further comprises a binding agent, e.g., mineral oil, wax, etc.

Aspect 70. The composition defined in any one of aspects 62-69, wherein the weight ratio of glycerol stearate:antioxidant is in any range disclosed herein, e.g., from about 3:1 to about 1:75, from about 2:1 to about 1:50, from about 1:1.5 to about 1:15, etc.

Aspect 71. The composition defined in any one of aspects 62-70, wherein the glycerol stearate is defined in any one of aspects 5-7.

Aspect 72. The composition defined in any one of aspects 62-71, wherein the antioxidant is defined in any one of aspects 10, 12-16, and 18-22.

Aspect 73. The composition defined in any one of aspects 62-72, wherein the masterbatch composition (or the additive blend composition, or the additive mixture) further comprises at least one other additive selected from an antiblock additive, a slip additive, a colorant, a filler, a UV additive, an anti-stat additive, a processing aid, an acid scavenger, a carbon centered radical scavenger, etc., or any combination thereof.

We claim:
1. A process for producing a polymer composition with improved color, the process comprising:
(a) contacting a chromium-based catalyst system with ethylene and an optional olefin comonomer under polymerization conditions in a polymerization reactor system to produce an ethylene polymer, wherein the ethylene polymer is characterized by a ratio of Mw/Mn from 5 to 40 and contains less than 0.2 ppm of Hf and Zr and less than 5 ppm Mg; and (b) combining the ethylene polymer with an additive system comprising a glycerol stearate and an antioxidant to form the polymer composition, wherein the polymer composition contains:

50 ppm to 1500 ppm of the glycerol stearate; and 250 ppm to 7500 ppm of the antioxidant, wherein the antioxidant comprises a phenolic antioxidant and a phosphite antioxidant, and a ppm amount of the phenolic antioxidant in the polymer composition is greater than that of the phosphite antioxidant in the polymer composition; and wherein the polymer composition does not contain a thioester antioxidant.

2. The process of claim 1, wherein:

the polymerization reactor system comprises a solution reactor, a gas-phase reactor, a slurry reactor, or a combination thereof;

the ethylene polymer comprises an ethylene homopolymer, an ethylene/1-butene copolymer, an ethylene/1-hexene copolymer, and/or an ethylene/1-octene copolymer; and the combining comprises blending and/or melt processing.

3. The process of claim 1, wherein:

the polymer composition comprises from 500 ppm to 3500 ppm of the antioxidant;

the phosphite antioxidant comprises a monophosphite antioxidant;

the polymer composition has an aged PE color number of at least 200 after storage for 4 weeks at a temperature of 80° C.; and the polymer composition has a multi-pass extrusion PE color number of at least 200 after three extrusion passes at an extrusion temperature of 240° C.

4. The process of claim 1, wherein:

the ethylene polymer comprises an ethylene homopolymer, an ethylene/1-butene copolymer, an ethylene/1-hexene copolymer, and/or an ethylene/1-octene copolymer.

5. The process of claim 4, wherein the ethylene polymer is characterized by a Mw from 150,000 to 750,000 g/mol.

6. The process of claim 4, wherein at least 75 wt. % of the glycerol stearate is glycerol monostearate.

7. The process of claim 4, wherein the polymer composition contains:

100 ppm to 850 ppm of the glycerol stearate; and 500 ppm to 5000 ppm of the antioxidant.

8. The process of claim 4, wherein:

the polymer composition is in the form of pellets; and the polymer composition has an initial PE color number of at least 200.

9. The process of claim 4, wherein the phenolic antioxidant comprises pentaerythritol tetrakis(3-(3,5-di-tert-butyl-4-hydroxyphenyl) propionate, octadecyl-3-(3,5-di-tertbutyl-4-hydroxyphenyl) propionate, 1,3,5-trimethyl-2,4,6-tris(3,5-di-tert-butyl-4-hydroxybenzyl)benzene, tris(3,5-di-tert-butyl-4-hydroxybenzyl) isocyanurate, 2,2'-ethylidenebis(4,6-di-tert-butylphenol), 1,2-bis(3,5-di-tert-butyl-4-hydroxy hydrocinnamoyl) hydrazine, or any combination thereof.

10. The process of claim 4, wherein the phosphite antioxidant comprises tris(2,4,6-di-tert-butylphenyl) phosphite, 2,2'-methylenebis(2,4-di-tert-butylphenyl) 2-ethylhexyl phosphite, or a combination thereof.

11. The process of claim 4, wherein the polymer composition further comprises at least one other additive selected from an antiblock additive, a slip additive, a colorant, a filler, a UV additive, an anti-stat additive, a processing aid, an acid scavenger, a carbon centered radical scavenger, or any combination thereof.

12. The process of claim 4, wherein the polymer composition contains 350 ppm to 2000 ppm of the phenolic antioxidant.

13. The process of claim 4, wherein the ethylene polymer is characterized by:

a density from 0.88 to 0.96 g/cm$^3$;

a Mw from 150,000 to 750,000 g/mol;

a melt index (MI) from 0 to 0.5 g/10 min; and a high load melt index (HLMI) from 0.5 to 25 g/10 min.

14. The process of claim 4, wherein:

the polymer composition has an initial PE color number that is greater than that or within 20 of an otherwise equivalent polymer composition that contains 500 ppm of a diphosphite antioxidant instead of the glycerol stearate;

the polymer composition has an aged PE color number after storage for 4 weeks at a temperature of 80° C. that is greater than or within 20 of an aged PE color number after storage for 4 weeks at a temperature of 80° C. for an otherwise equivalent polymer composition that contains 500 ppm of a diphosphite antioxidant instead of the glycerol stearate;

the polymer composition has a multi-pass extrusion PE color number after three extrusion passes at an extrusion temperature of 240° C. that is greater than that or within 20 of an otherwise equivalent polymer composition that contains 500 ppm of a diphosphite antioxidant instead of the glycerol stearate; or any combination thereof.

15. The process of claim 4, wherein:

the phenolic antioxidant comprises pentaerythritol tetrakis(3-(3,5-di-tert-butyl-4-hydroxyphenyl) propionate, octadecyl-3-(3,5-di-tertbutyl-4-hydroxyphenyl) propionate, 1,3,5-trimethyl-2,4,6-tris(3,5-di-tert-butyl-4-hydroxybenzyl)benzene, tris(3,5-di-tert-butyl-4-hydroxybenzyl) isocyanurate, 2,2'-ethylidenebis(4,6-di-tert-butylphenol), 1,2-bis(3,5-di-tert-butyl-4-hydroxy hydrocinnamoyl) hydrazine, or any combination thereof; and the phosphite antioxidant comprises tris(2,4,6-di-tert-butylphenyl) phosphite, 2,2'-methylenebis(2,4-di-tert-butylphenyl) 2-ethylhexyl phosphite, or a combination thereof.

16. The process of claim 15, wherein the polymer composition contains 350 ppm to 2000 ppm of the phenolic antioxidant.

17. The process of claim 15, wherein a weight ratio of the phenolic antioxidant to the phosphite antioxidant in the polymer composition is from 1.4:1 to 4.8:1.

18. The process of claim 17, wherein the polymer composition contains 350 ppm to 2000 ppm of the phenolic antioxidant.

19. The process of claim 17, wherein the polymer composition contains 200 ppm to 3000 ppm of the phosphite antioxidant.

20. A process for producing a polymer composition with improved color, the process comprising:

(a) contacting a chromium-based catalyst system with ethylene and an optional olefin comonomer under polymerization conditions in a polymerization reactor system to produce an ethylene polymer, wherein the ethylene polymer is characterized by a ratio of Mw/Mn from 5 to 40 and contains from 0.5 to 15 ppm Cr, less than 0.2 ppm of Hf and Zr, and less than 5 ppm Mg; and (b) combining the ethylene polymer with an additive system comprising a glycerol stearate and an antioxidant to form the polymer composition, wherein the polymer composition contains:
50 ppm to 1500 ppm of the glycerol stearate; and
250 ppm to 7500 ppm of the antioxidant; wherein:
the antioxidant comprises a phenolic antioxidant and a phosphite antioxidant;
a ppm amount of the phenolic antioxidant in the polymer composition is greater than that of the phosphite antioxidant in the polymer composition;
the phenolic antioxidant comprises pentaerythritol tetrakis(3-(3,5-di-tert-butyl-4-hydroxyphenyl) propionate, octadecyl-3-(3,5-di-tertbutyl-4-hydroxyphenyl) propionate, 1,3,5-trimethyl-2,4,6-tris(3,5-di-tert-butyl-4-hydroxybenzyl)benzene, tris(3,5-di-tert-butyl-4-hydroxybenzyl) isocyanurate, 2,2'-ethylidenebis(4,6-di-tert-butylphenol), 1,2-bis(3,5-di-tert-butyl-4-hydroxy hydrocinnamoyl) hydrazine, or any combination thereof; and
the polymer composition does not contain a thioester antioxidant.

21. The process of claim 20, wherein the polymer composition contains 350 ppm to 2000 ppm of the phenolic antioxidant.

22. The process of claim 20, further comprising forming a blow molded product from the polymer composition.

23. The process of claim 20, wherein the ethylene polymer is characterized by a Mw from 150,000 to 750,000 g/mol.

* * * * *